US 7,200,486 B2

(12) United States Patent
Tanaka et al.

(10) Patent No.: US 7,200,486 B2
(45) Date of Patent: Apr. 3, 2007

(54) APPARATUS FOR ESTIMATING QUANTITY OF INTAKE AIR FOR INTERNAL COMBUSTION ENGINE

(75) Inventors: Satoru Tanaka, Susono (JP); Robert Bickel, Numazu (JP); Akira Ohata, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 143 days.

(21) Appl. No.: 10/490,477

(22) PCT Filed: Oct. 15, 2002

(86) PCT No.: PCT/JP02/10642

§ 371 (c)(1),
(2), (4) Date: Mar. 24, 2004

(87) PCT Pub. No.: WO03/033897

PCT Pub. Date: Apr. 24, 2003

(65) Prior Publication Data

US 2004/0260482 A1    Dec. 23, 2004

(30) Foreign Application Priority Data

Oct. 15, 2001    (JP) .............................. 2001-316350

(51) Int. Cl.
  *F02D 41/14*    (2006.01)
(52) U.S. Cl. ...................... 701/109; 73/118.2; 701/103
(58) Field of Classification Search ................ 701/109, 701/103, 104, 114, 59; 123/337, 480; 73/116, 73/117.1, 117.2, 117.3, 118.2, 119 A
  See application file for complete search history.

(56) References Cited

U.S. PATENT DOCUMENTS

| 3,584,508 | A | * | 6/1971 | Shiba ....................... 73/861.72 |
| 4,963,360 | A | | 10/1990 | Argaud ....................... 424/443 |
| 5,012,422 | A | | 4/1991 | Takahashi et al. ..... 364/431.05 |
| 5,341,674 | A | * | 8/1994 | Kunzfeld ..................... 73/116 |
| 5,889,205 | A | | 3/1999 | Treinies et al. ............ 73/118.2 |

(Continued)

FOREIGN PATENT DOCUMENTS

DE    197 53 873 A1    6/1999

(Continued)

OTHER PUBLICATIONS

Jin Kusaka et al., "A Basic Study for Homogenous Charge Compression Ignition Characteristics of Natural Gas Mixture by Using Chemical Kinetic Simulations", Transactions of Society of Automotive Engineers of Japan, Jan. 15, 2001, vol. 32, No. 1, pp. 29-34.

*Primary Examiner*—Willis R. Wolfe, Jr.
*Assistant Examiner*—Johnny H. Hoang
(74) *Attorney, Agent, or Firm*—Oliff & Berridge, PLC

(57) ABSTRACT

An intake-air quantity estimation apparatus for an internal combustion engine, including an intake-air quantity estimation device that includes a cylinder pressure estimation device that estimates pressure within a cylinder through calculation using a model of the cylinder obtained based on a law of conservation of energy, the intake-air quantity estimation device estimates a cylinder intake-air quantity based on the estimated pressure within the cylinder, the cylinder intake-air quantity representing the amount of air flowing into the cylinder.

14 Claims, 19 Drawing Sheets

U.S. PATENT DOCUMENTS

| | | | | |
|---|---|---|---|---|
| 5,931,140 A | * | 8/1999 | Maloney | 123/480 |
| 6,529,818 B2 | * | 3/2003 | Kitajima et al. | 701/112 |

FOREIGN PATENT DOCUMENTS

| EP | 0 326 065 A2 | 8/1989 |
|---|---|---|
| JP | A 63-289237 | 11/1988 |
| JP | A 2-70957 | 3/1990 |
| JP | A-5-222998 | 8/1993 |
| JP | A 6-74076 | 3/1994 |
| JP | 09-053503 | 2/1997 |
| JP | B2 2623732 | 4/1997 |
| JP | A 11-504093 | 4/1999 |
| JP | A 11-229936 | 8/1999 |
| WO | WO 96/32579 | 10/1996 |

* cited by examiner

APPARATUS FOR ESTIMATING QUANTITY OF INTAKE AIR FOR INTERNAL COMBUSTION ENGINE

TECHNICAL FIELD

The present invention relates to an intake-air quantity estimation apparatus for estimating the amount of air flowing into a cylinder of an internal combustion engine by use of intake-system-related models (simulation models and physical models).

BACKGROUND ART

In order to attain a predetermined air-fuel ratio of air-fuel mixture to be burned in an internal combustion engine, the amount of air flowing into a cylinder (combustion chamber) of the internal combustion engine (hereinafter referred to as "cylinder intake-air quantity Mc") must be accurately obtained. Usually, an air flow sensor is provided in an intake passage of the internal combustion engine, and the cylinder intake-air quantity Mc is estimated from an output value of the air flow rate sensor. However, when the internal combustion engine is in the state of transient operation; for example, when the opening of a throttle valve varies greatly with time, difficulty is encountered in accurately obtaining the cylinder intake-air quantity Mc from an output value of the intake-air flow sensor. Thus, in recent years, various attempts have been made to accurately estimate the cylinder intake-air quantity Mc by use of intake-system-related models that are represented by expressions obtained on the basis of hydrodynamics or the like (refer to, for example, Japanese Patent Application Laid-Open (kokai) No. 6-74076). FIG. 21 shows an intake-air quantity estimation apparatus that the applicants of the present application have been studying. The intake-air quantity estimation apparatus includes an electronic-control throttle model M10, a throttle model M20, an intake valve model M30, and an intake pipe model M40.

The cylinder intake-air quantity Mc becomes definite when the intake valve is closed (at intake-valve-closing time), and is proportional to pressure within the cylinder at this point of time. Pressure within the cylinder at intake-valve-closing time can be considered equal to pressure as observed upstream of the intake valve; i.e., equal to the air pressure Pm within an intake pipe (intake-pipe pressure). Thus, the intake-air quantity estimation apparatus shown in FIG. 21 is adapted to estimate the intake-pipe air pressure Pm at intake-valve-closing time by use of the models M10 to M40 and to estimate the cylinder intake-air quantity Mc from the estimated intake-pipe air pressure Pm.

More specifically, the electronic-control throttle model M10 is adapted to estimate the throttle-valve opening θt at intake-valve-closing time. The throttle model M20 is obtained on the basis of the law of conservation of energy, the law of conservation of momentum, the law of conservation of mass, and the equation of state and is adapted to estimate the flow rate mt of air passing through the throttle valve (throttle-passing air flow rate).

The intake valve model M30 is adapted to estimate a cylinder intake-air flow rate mc from the intake-pipe air pressure Pm, an intake-pipe air temperature Tm, an intake-air temperature Ta, and the like. In other words, as mentioned above, since the cylinder intake-air flow rate mc is considered proportional to the intake-pipe air pressure Pm, the intake valve model M30 obtains the cylinder intake-air flow rate mc in accordance with the following Eq. (1), which is obtained from an empirical rule (a rule of thumb).

$$mc = (Ta/Tm) \cdot (c \cdot Pm - d) \qquad (1)$$

In Eq. (1), c represents a coefficient of proportion, and d represents the amount of burned gas remaining in the cylinder (this value can be considered to be the amount of gas within the cylinder at exhaust-valve-closing time and is hereinafter referred to as merely "burned gas quantity d"). The intake valve model M30 stores tables (look-up tables or maps) that specify the relationships of the coefficient of proportion c and the burned gas quantity d, respectively, to the engine speed Ne, the intake-valve opening/closing timing VT, the intake-valve maximum lift Lmax, and the like. The intake valve model M30 obtains the coefficient of proportion c and the burned gas quantity d on the basis of the stored tables, the actual engine speed Ne, the actual intake-valve opening/closing timing VT, and the intake-valve maximum lift Lmax. At the time of computation, the intake valve model M30 estimates the cylinder intake-air flow rate mc by applying to Eq. (1) the last (latest) intake-pipe air pressure Pm and intake-pipe air temperature Tm at intake-valve-closing time, these last values having already been estimated by the intake pipe model M40, which will be described later.

The intake pipe model M40 is adapted to estimate the intake-pipe air pressure Pm at intake-valve-closing time by use of the throttle-passage air flow rate mt estimated by the throttle model M20 and the cylinder intake-air flow rate mc estimated by the intake valve model M30 and in accordance with expressions obtained on the basis of the law of conservation of mass and the law of conservation of energy, respectively. The intake-air quantity estimation apparatus is adapted to estimate the cylinder intake-air quantity Mc on the basis of the intake-pipe air pressure Pm at intake-valve-closing time, the intake-pipe air pressure Pm being estimated by the intake pipe model M40.

However, in the above-described intake valve model M30, the coefficient of proportion c and the burned gas quantity d are obtained by means of table searches involving a number of parameters, such as the engine speed Ne, the intake-valve opening/closing timing VT, and the intake-valve maximum lift Lmax; and the intake-air flow rate mc is estimated on the basis of the obtained coefficient of proportion c and burned gas quantity d. Thus, the intake valve model M30 involves the following problems: difficulty is encountered in determining the coefficient of proportion c and the burned gas quantity d for obtaining an accurate intake-air flow rate mc, with respect to all possible combinations of the parameters, the combinations totaling a huge number; and legitimacy check (adjustment) for c and d is very labor intensive.

DISCLOSURE OF THE INVENTION

In order to cope with the above problems, an intake-air quantity estimation apparatus for an internal combustion engine according to the present invention comprises intake-air quantity estimation means including cylinder pressure estimation means for estimating pressure within a cylinder through calculation using a model of the cylinder obtained on the basis of the law of conservation of energy, the intake-air quantity estimation means estimating a cylinder intake-air quantity on the basis of the estimated pressure within the cylinder, the cylinder intake-air quantity representing the amount of air flowing into the cylinder.

According to the present invention, pressure within the cylinder (cylinder pressure) can be obtained by means of calculation. Obtainment of a cylinder pressure allows calculational obtainment of the cylinder intake-air quantity.

Thus, the cylinder intake-air-quantity can be accurately obtained without involvement of legitimacy check (adjustment) on table values (the coefficient of proportion c, the burned gas quantity d, and the like) with respect to combinations of many parameters.

In this case, preferably, the model of the cylinder to be used by the cylinder pressure estimation means is configured on the basis of an expression $dPc/dt=(\kappa \cdot R \cdot Tm/Vc)/\cdot mc-(\kappa \cdot Pc/Vc)\cdot(dVc/dt)+(\kappa-1)\cdot Q/Vc$, where Pc is pressure within the cylinder, $\kappa$ is the ratio of specific heat, R is the gas constant, Tm is the temperature of air flowing into the cylinder, Vc is a cylinder volume, mc is a cylinder intake-air flow rate representing the flow rate of air flowing into the cylinder, and Q is a heat quantity to be transmitted between the cylinder and the exterior of the cylinder.

In the above expression, the heat quantity Q is preferably neglected. Since the heat quantity Q is relatively small, neglecting the heat quantity Q allows estimation of pressure within the cylinder on the basis of simpler calculation without involvement of a substantial impairment in estimation accuracy for pressure within the cylinder.

Preferably, the intake-air quantity estimation means is configured so as to obtain a cylinder intake-air flow rate representing the flow rate of air flowing into the cylinder by use of an intake valve model associated with air passing through an intake valve and obtained on the basis of the law of conservation of energy, the law of conservation of momentum, and the law of conservation of mass, and to estimate the cylinder intake-air quantity on the basis of the obtained cylinder intake-air flow rate. In other words, the intake valve model estimates cylinder intake-air flow rate from the above-estimated pressure within the cylinder.

According to the above configuration, since the cylinder intake-air quantity can be estimated by means of a model (expression) represented in accordance with physical laws, rather than an empirical rule (a rule of thumb), estimation accuracy for cylinder intake-air quantity can be enhanced.

Preferably, the intake-air quantity estimation means is configured so as to estimate the cylinder intake-air quantity by use of an exhaust valve model associated with air passing through an exhaust valve and obtained on the basis of the law of conservation of energy, the law of conservation of momentum, and the law of conservation of mass.

According to the above configuration, since the amount of air flowing into the cylinder via the exhaust valve is considered, estimation accuracy for cylinder intake-air quantity can be enhanced.

Preferably, the cylinder pressure estimation means is configured so as to estimate pressure within the cylinder in accordance with an expression obtained by solving, while the cylinder volume is assumed to be constant, the expression representing the model of a cylinder, and an expression obtained by solving, while the flow rate of air flowing into the cylinder is assumed to be 0, the expression representing the model of a cylinder.

According to the above configuration, a hunting phenomenon of estimated results can be suppressed without need to drastically shorten calculation time intervals for estimating a cylinder pressure by use of a digital computer. As a result, the estimated pressure can approximate actual pressure within the cylinder.

Preferably, in order to obtain an input quantity to be used by the intake valve model, the intake-air quantity estimation means is configured so as to obtain a throttle-passing air flow rate representing the flow rate of air passing through a throttle valve of the internal combustion engine in accordance with a calculation equation by use of a throttle model associated with air passing through the throttle valve; and the intake-air quantity estimation means further comprises intake-air-flow-rate-measuring means for actually measuring an intake-air flow rate representing the flow rate of air flowing through an intake passage of the internal combustion engine, and a throttle-model correction section for correcting a value to be used in the calculation equation of the throttle model through utilization of a fact that, when the internal combustion engine is in the steady state of operation, the intake-air flow rate measured by the intake-air-flow-rate-measuring means and the cylinder intake-air flow rate obtained by use of the intake valve model become equal to each other.

In this case, preferably, the calculation equation of the throttle model is obtained on the basis of the law of conservation of energy, the law of conservation of momentum, and the law of conservation of mass.

When the throttle-valve opening of an internal combustion engine is small, even a slight change in the throttle-valve opening causes a great change in the flow rate of air passing through the throttle valve (throttle-passing air flow rate). Thus, the throttle-passing air flow rate is highly susceptible to article differences (individual differences or manufacturing variations) among throttle valves and intake pipes. As a result, in some cases, the throttle model, which is designed in the same way among internal combustion engines, may fail to accurately estimate the throttle-passing air flow rate.

Thus, employment of the throttle-model correction section for correcting the throttle model enhances estimation accuracy for the intake-air quantity. Specifically, since, when the internal combustion engine is in the steady state of operation, the air flow rate is constant along the intake passage, the intake-air flow rate measured by the intake-air-flow-rate-measuring means, such as an air flowmeter, and the cylinder intake-air flow rate obtained by use of the intake valve model become equal to each other. Utilizing this fact, the throttle-model correction section corrects a value (specifically, a flow coefficient) to be used in the calculation equation of the throttle model.

More specifically, the throttle-model correction section obtains the intake-pipe air pressure to be used in the throttle model, through utilization of the fact that the intake-air flow rate measured by the intake-air-flow-rate-measuring means and the cylinder intake-air flow rate obtained by use of the intake valve model become equal to each other, and assumes that the throttle-passing air flow rate is equal to the intake-air flow rate measured by the intake-air-flow-rate-measuring means.

Then, the throttle-model correction section obtains an appropriate value for the flow coefficient on the basis of the obtained intake-pipe air pressure and the assumed throttle-passing air flow rate, and corrects the flow coefficient to be used in the throttle model, on the basis of the appropriate value for the flow coefficient, thereby correcting the throttle model.

In other words, when the internal combustion engine is in the steady state of operation, the throttle-model correction section specifies input and output values for the throttle model without use of the throttle model; reversely obtains a flow coefficient on the basis of the input and output values as well as the calculation equation of the throttle model; and uses the thus-obtained flow coefficient in the subsequent calculation of the throttle-passing air flow rate.

Thus, even in a transient state in which throttle-valve opening changes abruptly, the throttle-passing air flow rate can be obtained by use of an appropriate flow coefficient, thereby enhancing estimation accuracy for the cylinder intake-air quantity.

BEST MODE FOR CARRYING OUT THE INVENTION

Figure 1:
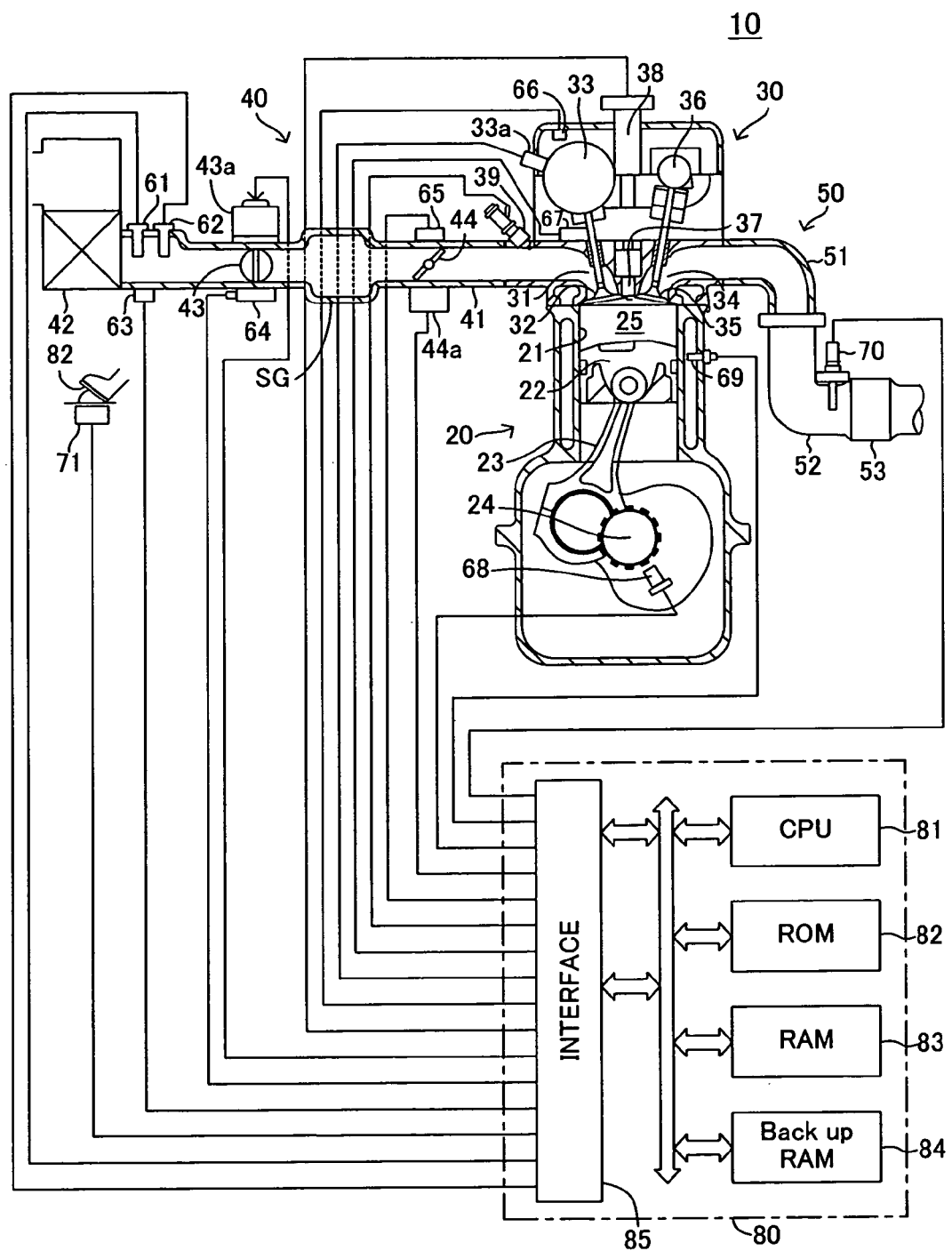
FIG. 1 is a schematic configuration diagram of a system configured such that a fuel injection quantity control apparatus including an intake-air quantity estimation apparatus according to a first embodiment of the present invention is applied to a spark-ignition multi-cylinder internal combustion engine.

Embodiments of a fuel injection quantity control apparatus including an intake-air quantity estimation apparatus for an internal combustion engine according to the present invention will be described with reference to the drawings. FIG. 1 shows a schematic configuration of a system configured such that a fuel injection quantity control apparatus according to a first embodiment of the present invention is applied to a spark-ignition multi-cylinder (e.g., 4-cylinder) internal combustion engine 10.

The internal combustion engine 10 includes a cylinder block section 20 including a cylinder block, a cylinder block lower-case, an oil pan, etc.; a cylinder head section 30 fixed on the cylinder block section 20; an intake system 40 for supplying gasoline-air mixture to the cylinder block section 20; and an exhaust system 50 for emitting exhaust gas from the cylinder block section 20 to the exterior of the engine.

The cylinder block section 20 includes cylinders 21, pistons 22, connecting rods 23, and crankshafts 24. The piston 22 reciprocates within the cylinder 21. The reciprocating motion of the piston 22 is transmitted to the crankshaft 24 via the connecting rod 23, whereby the crankshaft 24 rotates. The cylinder 21 and the head of the piston 22, together with a cylinder head section 30, form a combustion chamber 25.

The cylinder head section 30 includes an intake port 31 communicating with the combustion chamber 25; an intake valve 32 for opening and closing the intake port 31; an intake valve control unit 33 including an intake cam shaft for driving the intake valve 32, the unit 33 being able to continuously change the phase angle of the intake cam shaft and the valve lift (maximum valve lift) of the intake valve 32; an actuator 33a of the intake valve control unit 33; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector (fuel injection means) 39 for injecting fuel into the intake port 31.

The intake system 40 includes an intake pipe 41 including an intake manifold, communicating with the intake port 31, and forming an intake passage together with the intake port 31; an air filter 42 provided at an end portion of the intake pipe 41; a throttle valve 43 provided within the intake pipe 41 and adapted to vary the cross-sectional opening area of the intake passage; and a swirl control valve (hereinafter referred to as "SCV") 44. The throttle valve 43 is rotatively driven within the intake pipe 41 by a throttle valve actuator 43a, which consists of a DC motor. The SCV 44 is supported in such a manner as to be rotatable in relation to the intake pipe 41, at a position located downstream of the throttle valve 43 and upstream of the injector 39, and is rotatively driven by an SCV actuator 44a, which consists of a DC motor.

Figure 2:
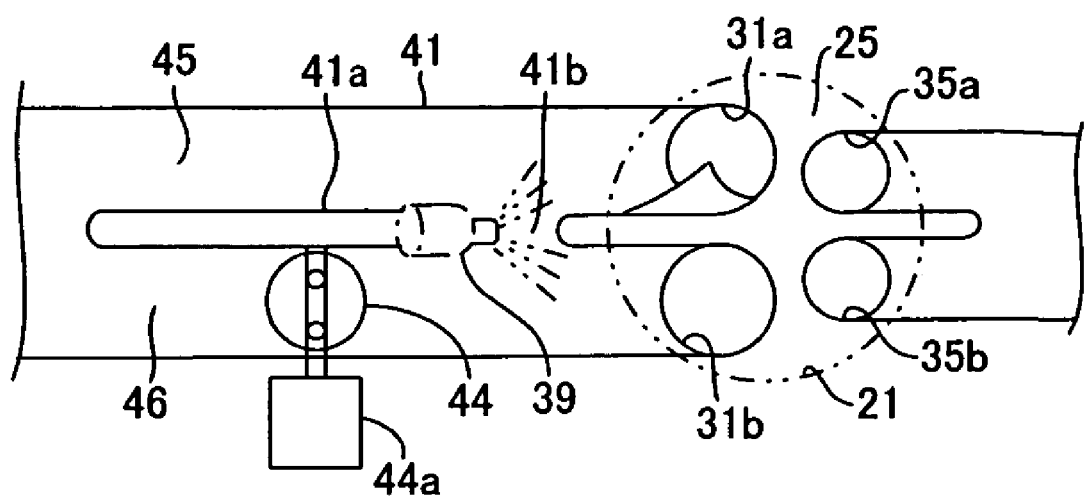
FIG. 2 is a schematic plan view showing the combustion chamber of a specific cylinder shown in FIG. 1, and a peripheral region of the combustion chamber.

FIG. 2 is a schematic plan view showing the combustion chamber 25 of one cylinder (a specific cylinder), and a peripheral region of the combustion chamber 25. As shown in FIG. 2, in actuality, the intake port 31 consists of a pair of intake ports 31a and 31b, the pair being provided on each cylinder. The intake port 31a is helically formed so as to generate a swirl (a whirling flow) within the combustion chamber 25, thereby assuming the form of a so-called swirl port, whereas the intake port 31b assumes the form of a so-called straight port. A partition 41a is formed in a portion of the intake pipe 41 that extends from a surge tank (denoted by symbol SG in FIG. 1) to each combustion chamber 25 (i.e., in a portion of the intake manifold), in such a manner as to extend along the longitudinal direction of the intake pipe 41, thereby dividing the intake pipe 41 into a first intake manifold 45 communicating with the intake port 31a and a second intake manifold 46 communicating with the intake port 31b. A communication passage 41b is formed at an appropriate position of the partition 41a for the purpose of establishing communication between the first and second intake manifolds 45 and 46. The injector 39 is fixed in the vicinity of the communication passage 41b so as to inject fuel toward the intake ports 31a and 31b.

The SCV 44 is provided in the second intake manifold 46. Accordingly, when the SCV 44 closes the second intake manifold 46, air (air-fuel mixture) enters the combustion chamber 25 mainly through the intake port 31a, and thus a swirl is generated within the combustion chamber 25, thereby allowing combustion with a highly lean air-fuel ratio. When the SCV 44 opens the second intake manifold 46, air enters the combustion chamber 25 through both intake ports 31a and 31b, and thus the amount of air flowing into the combustion chamber 25 increases, thereby allowing an increase in engine output.

Referring back to FIG. 1, the exhaust system 50 includes an exhaust manifold 51 communicating with the exhaust ports 34; an exhaust pipe 52 connected to the exhaust manifold 51; and a catalytic converter (a 3-way catalytic converter) 53 disposed in the exhaust pipe 52 in an intervening manner.

Meanwhile, this system includes a hot-wire air flowmeter 61; an intake-air temperature sensor 62; an atmospheric-pressure sensor (throttle-valve upstream pressure sensor) 63; a throttle position sensor 64; an SCV opening sensor 65; a cam position sensor 66; an intake-valve lift sensor 67; a crank position sensor 68; a water temperature sensor 69; an air-fuel ratio sensor ($O_2$ sensor) 70; and an accelerator opening sensor 71.

Figure 3:
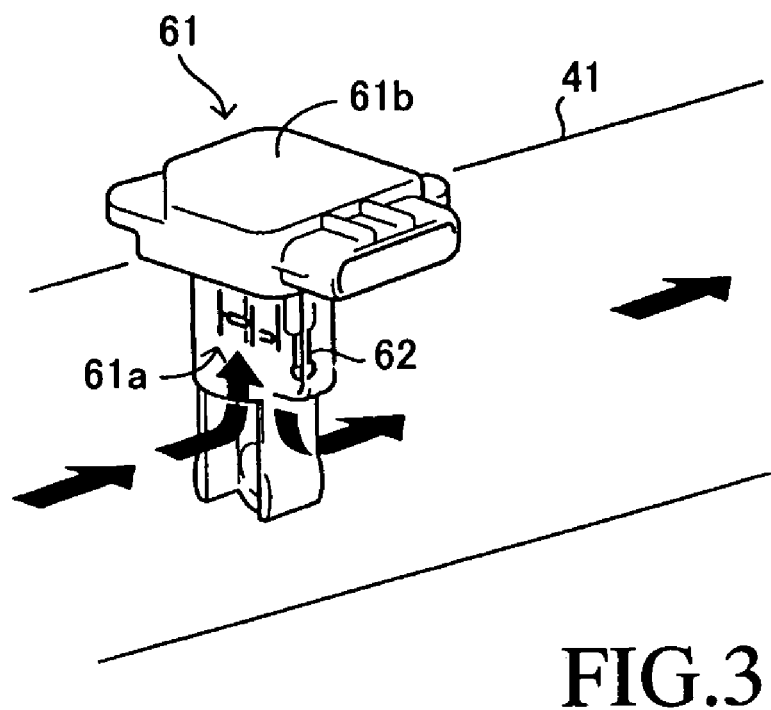
FIG. 3 is a schematic perspective view of an air flowmeter shown in FIG. 1.
Figure 4:
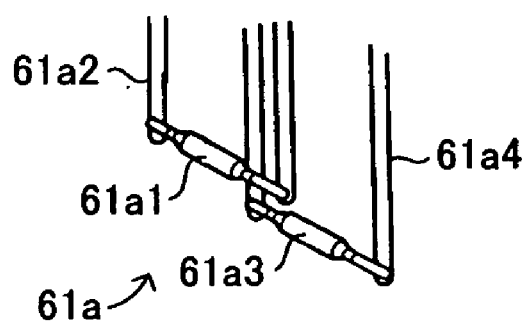
FIG. 4 is an enlarged perspective view of a hot-wire measuring portion of the air flowmeter shown in FIG. 3.
Figure 5:
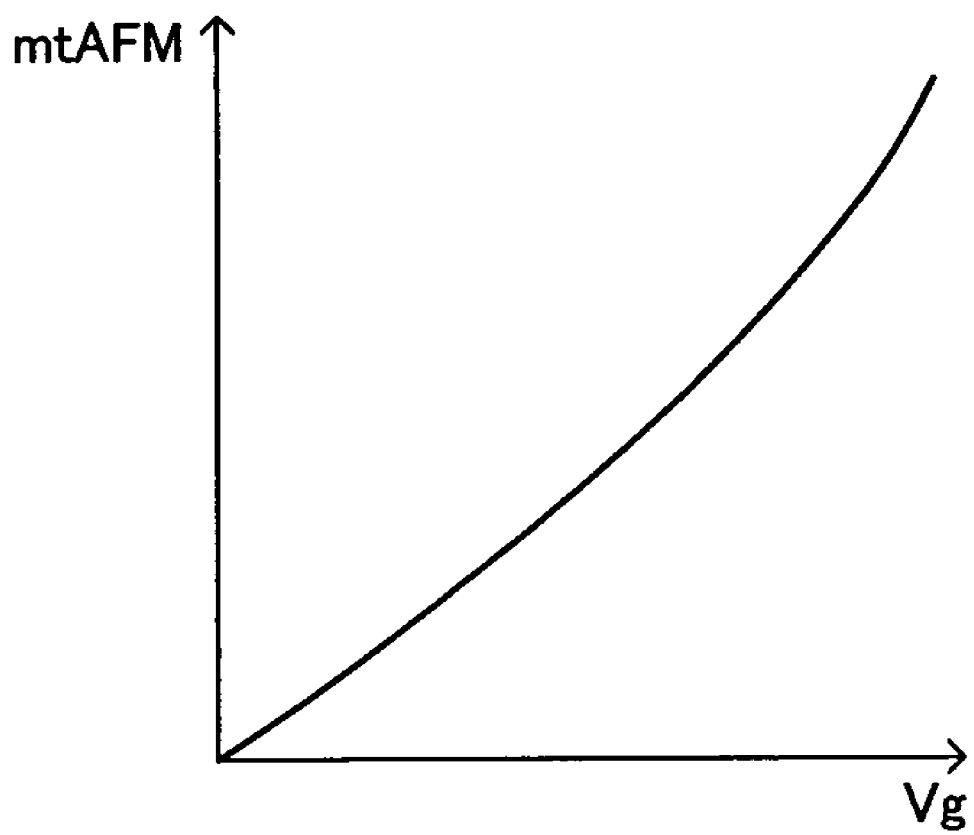
FIG. 5 is a table specifying the relationship between an output from the air flowmeter and an intake-air flow rate, the table being referenced by a CPU shown in FIG. 1.

The air flowmeter 61 serves as an intake-air-flow-rate-measuring means for measuring an actual intake-air flow rate, which is the flow rate of air flowing through the intake passage of the internal combustion engine 10. As shown in the schematic perspective view of FIG. 3, the air flowmeter 61 includes a bypass passage to which a portion of intake air flowing through the intake pipe 41 branches away; a hot-wire measuring portion 61a for measuring the mass flow rate of intake air flowing through the bypass passage; and a signal processing portion 61b that outputs the voltage Vg according to a measured mass flow rate. As shown in its enlarged perspective view of FIG. 4, the hot-air measuring portion 61a includes an intake-air-temperature-measuring resistor (a bobbin portion) 61a1 formed of a platinum hot-wire; a support portion 61a2 that connects the intake-air-temperature-measuring resistor 61a1 to the signal processing portion 61b to thereby hold the resistor 61a1; a heating resistor (heater) 61a3; and a support portion 61a4 that connects the heating resistor 61a3 to the signal processing portion 61b to thereby hold the resistor 61a3. The signal processing portion 61b has a bridge circuit composed of the intake-air-temperature-measuring resistor 61a1 and the heating resistor 61a3; regulates, by use of the bridge circuit, power to be supplied to the heating resistor 61a3 in such a manner as to maintain a constant temperature difference between the intake-air-temperature-measuring resistor 61a1 and the heating resistor 61a3; converts the supplied power to the voltage Vg; and outputs the voltage Vg. FIG. 5 shows the relationship between the output Vg of the air flowmeter 61 and the intake-air flow rate mtAFM.

The intake-air temperature sensor 62 is provided within the air flowmeter 61 and is adapted to detect the temperature of intake air and to output a signal indicative of the intake-air temperature Ta. The atmospheric-pressure sensor 63 detects pressure as observed upstream of the throttle valve 43 (i.e., the atmospheric pressure) and outputs a signal indicative of the throttle-valve upstream pressure Pa. The throttle position sensor 64 detects the opening of the throttle valve 43 (throttle-valve opening) and outputs a signal indicative of the throttle-valve opening TA. The SCV opening sensor 65 detects the opening of the SCV 44 and outputs a signal indicative of the SCV opening θiv.

The cam position sensor 66 generates a signal that assumes the form of a single pulse (G2 signal) every time the intake cam shaft rotates by 90° (i.e., every time the crankshaft 24 rotates by 180°). The intake valve lift sensor 67 detects the lift of the intake valve 31 and outputs a signal that indicates the intake-valve lift L and assumes a value of "0" when the intake valve closes completely. The crank position sensor (engine speed sensor) 68 outputs a signal that assumes the form of a narrow pulse every 10° rotation of the crankshaft 24 and assumes the form of a wide pulse every 360° rotation of the crankshaft 24. This signal indicates the engine speed Ne. The water temperature sensor 69 detects the temperature of cooling water for the internal combustion engine 10 and outputs a signal indicative of the cooling-water temperature THW. The $O_2$ sensor 70 outputs a signal according to the oxygen concentration of exhaust gas flowing into the catalytic converter 53 (a value according to the air-fuel ratio of exhaust gas). The accelerator opening sensor 71 output a signal indicative of the travel Accp of an accelerator pedal operated by a driver.

An electric control device 80 is a microcomputer, which includes the following mutually bus-connected elements: a CPU 81; a ROM 82 in which programs to be executed by the CPU 81, tables (maps), constants, and the like are stored in advance; a RAM 83 in which the CPU 81 stores data temporarily as needed; a backup RAM 84, which stores data while power is held on and which retains the stored data even while power is held off; and an interface 85 including an AD converter. The interface 85 is connected to the sensors 61 to 71. Signals from the sensors 61 to 71 are supplied to the CPU 81 through the interface 85. Drive signals from the CPU 81 are sent, through the interface 85, to the actuator 33a of the intake valve control unit 33, the igniter 38, the injector 39, the throttle valve actuator 43a, and the SCV actuator 44a.

Next will be described how the thus-configured fuel injection quantity control apparatus determines the fuel injection quantity by use of simulation models (a method of estimating the cylinder intake-air quantity Mc). Processing described below is performed through the CPU 81 executing programs.

(Method of Determining Fuel Injection Quantity fc and Method of Estimating Cylinder Intake-Air Quantity)

Before the intake valve 32 of a cylinder in the process of an intake stroke closes, the fuel injection quantity control apparatus must inject fuel into the cylinder. Even in the case of an internal combustion engine in which fuel is injected directly into the combustion chamber 25, fuel needs to be injected before end of the intake stroke. Thus, before the intake valve closes, the fuel injection quantity control apparatus estimates the cylinder intake-air quantity Mc indicative of the amount of air that will be contained in the cylinder when the intake valve 32 closes (i.e., at intake-valve-closing time), and determines the fuel injection quantity (basic injection quantity) fc in accordance with Eq. (2) shown below. In Eq. (2), K represents a coefficient determined on the basis of a set air-fuel ratio, which varies with the state of operation.

$$fc = K \cdot Mc \quad (2)$$

Figure 6:
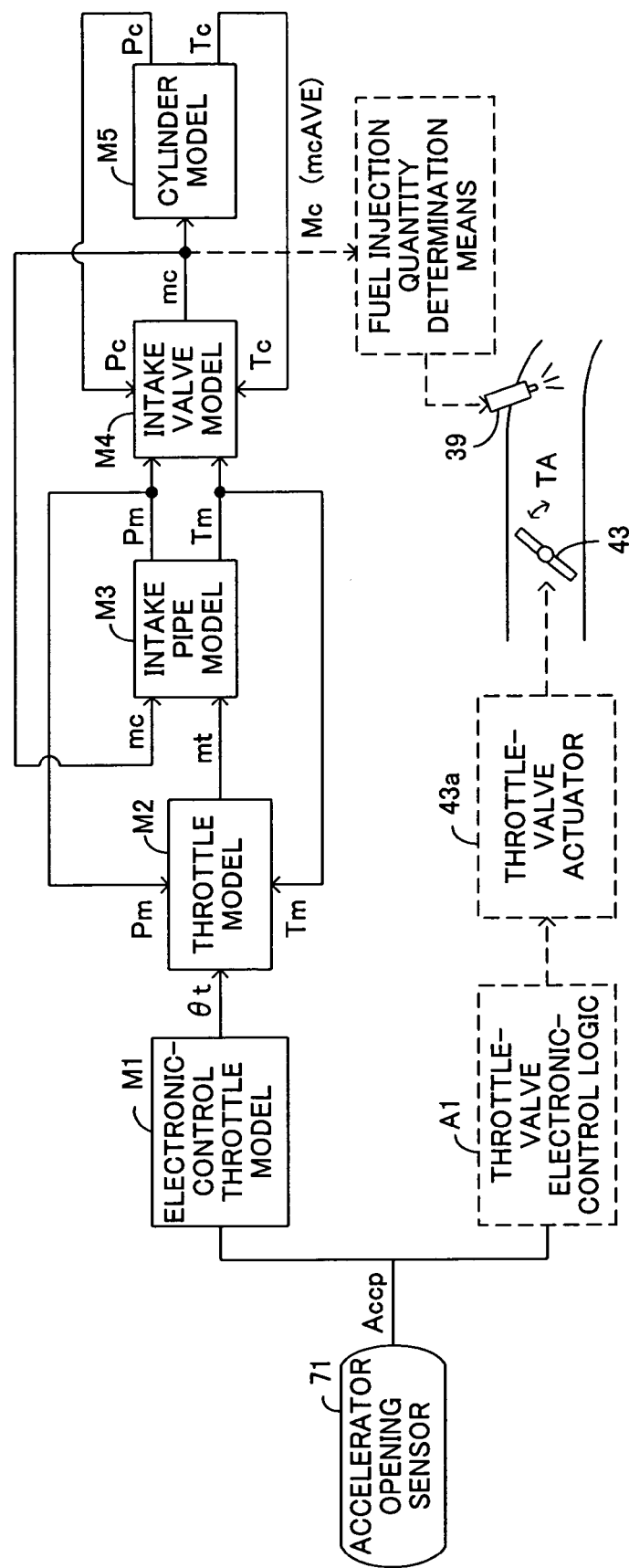
FIG. 6 is a functional block diagram showing interconnected various models employed by an electric control unit shown in FIG. 1 for estimating a cylinder intake-air quantity.

More specifically, as shown in FIG. 6, the fuel injection quantity control apparatus (intake-air quantity estimation apparatus) estimates the cylinder intake-air quantity Mc by use of simulation models; specifically, an electronic-control throttle model M1, a throttle model M2, an intake pipe model M3, an intake valve model M4, and a cylinder model M5. The cylinder model M5 functions as a cylinder pressure estimation means. The models M1 to M5 constitute an intake-air quantity estimation means for estimating the amount of air flowing into the cylinder 21.

(Electronic-Control Throttle Model M1)

Figure 7:
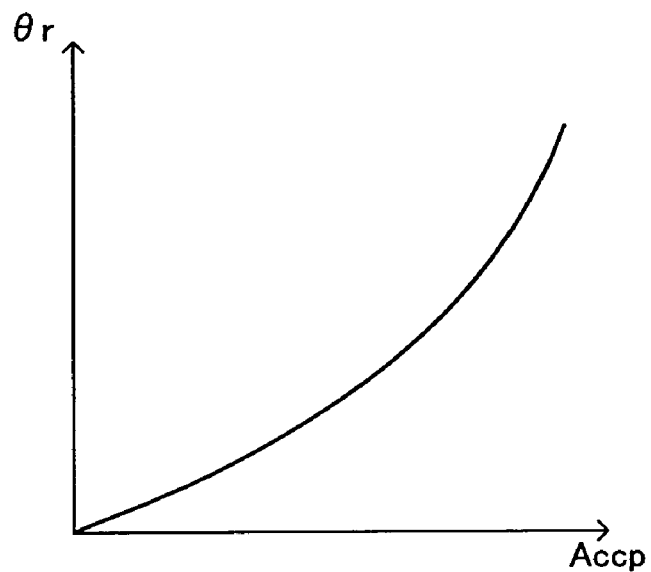
FIG. 7 is a table specifying the relationship between an accelerator pedal travel and a target throttle-valve opening, the table being referenced by the CPU shown in FIG. 1.

The electronic-control throttle model M1 estimates the throttle-valve opening θt at time t, which is a predetermined time T0 ahead of the current point of time, on the basis of the accelerator pedal travel Accp up to the current point of time. In the present embodiment, the throttle-valve electronic-control logic A1 obtains a provisional target throttle-valve opening θr1 on the basis of the accelerator pedal travel Accp detected by an accelerator opening sensor 71 and the table of FIG. 7 specifying the relationship between the accelerator pedal travel Accp and the target throttle-valve opening θr. The thus-obtained provisional target throttle-valve opening θr1 is delayed by a predetermined time T (e.g., 64 msec), and is used as a final target throttle-valve opening θr. The throttle-valve electronic-control logic A1 (electric control device 80) sends a drive signal to the throttle-valve actuator 43a such that the actual throttle-valve opening TA assumes the target throttle-valve opening θr.

As described above, the target throttle-valve opening θr is equal to the provisional target throttle-valve opening θr1 that is determined in accordance with the accelerator pedal travel Accp at a point of time that is a predetermined time T before the current point of time. Accordingly, the target throttle-valve opening θr at time t, which is a predetermined time T0 ahead of the current point of time, is equal to a provisional target throttle-valve opening θr1 at a point of time that is time (T-T0) before the current point of time. When an operation delay time of the throttle-valve actuator 43a is neglected, the provisional target throttle-valve opening θr1 at a point of time that is time (T-T0) before the current point of time is equal to the throttle-valve opening θt. On the basis of this idea, the electronic-control throttle model M1 estimates the throttle-valve opening θt at time t, which is a predetermined time T0 ahead of the current point of time. In other words, according to the estimation, the provisional target throttle-valve opening θr1 at a point of time that is time (T-T0) before the current point of time is taken as the throttle-valve opening θt at time t, which is a predetermined time T0 ahead of the current point of time. Notably, the throttle-valve opening θt may be estimated in consideration of an operation delay time of the throttle-valve actuator 43a.

(Throttle Model M2)

The throttle model M2 estimates the flow rate mt of air passing through the throttle valve 43 (throttle-passing air flow rate) in accordance with Eqs. (3) and (4) below, which are obtained on the basis of physical laws, such as the law of conservation of energy, the law of conservation of momentum, the law of conservation of mass, and the equation of state. In Eqs. (3) and (4), Ct(θt) is the flow coefficient, which varies with the throttle-valve opening θt; At(θt) is a throttle opening area (the area of opening of the intake pipe 41), which varies with the throttle-valve opening θt; Pa is a throttle-valve upstream pressure (i.e., the atmospheric pressure); Pm is an air pressure within the intake pipe (intake-pipe pressure); Ta is an intake-air temperature (the atmospheric temperature); Tm is an intake-pipe air temperature as observed downstream of the throttle valve 43; R is the gas constant; and κ is the ratio of specific heat (hereinafter, κ is handled as a constant value). The throttle model M2 uses Eq. (3) in the case of regular flow where the throttle-valve upstream pressure Pa is higher than the intake-pipe air pressure Pm, and uses Eq. (4) in the case of reverse flow where the throttle-valve upstream pressure Pa is lower than the intake-pipe air pressure Pm.

$$m_t = C_t(\theta_t) A_t(\theta_t) P_a \sqrt{\frac{\kappa+1}{2\kappa R T_a}} \sqrt{\left(\frac{\kappa}{\kappa+1}\right)^2 - \left(\frac{P_m}{P_a} - \frac{1}{\kappa+1}\right)^2} \quad (3)$$

$$m_t = C_t(\theta_t) A_t(\theta_t) P_m \sqrt{\frac{\kappa+1}{2\kappa R T_m}} \sqrt{\left(\frac{\kappa}{\kappa+1}\right)^2 - \left(\frac{P_a}{P_m} - \frac{1}{\kappa+1}\right)^2} \quad (4)$$

Figure 8:
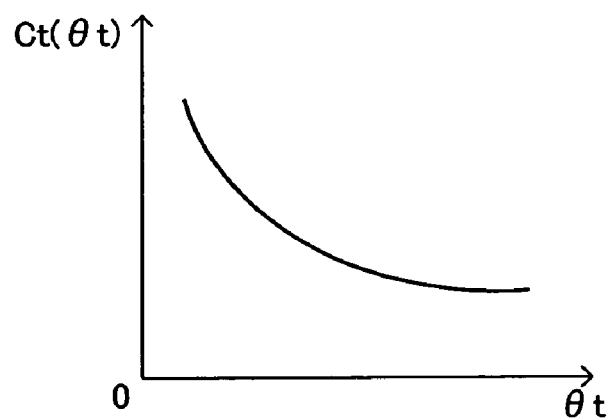
FIG. 8 is a table specifying the relationship between a throttle-valve opening and a flow coefficient.
Figure 9:
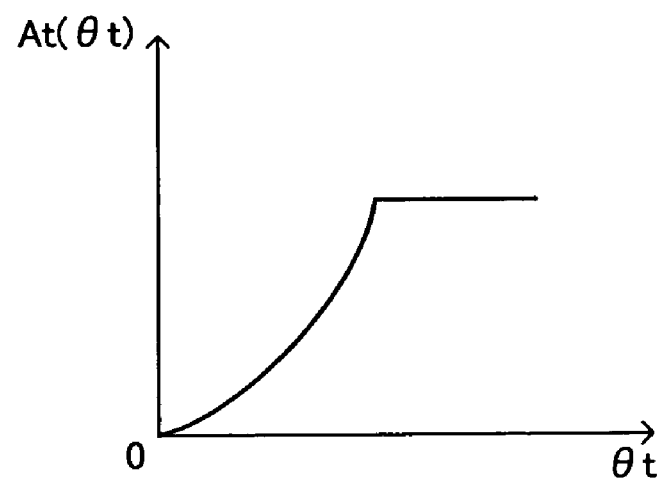
FIG. 9 is a table specifying the relationship between the throttle-valve opening and an opening area.
Figure 10:
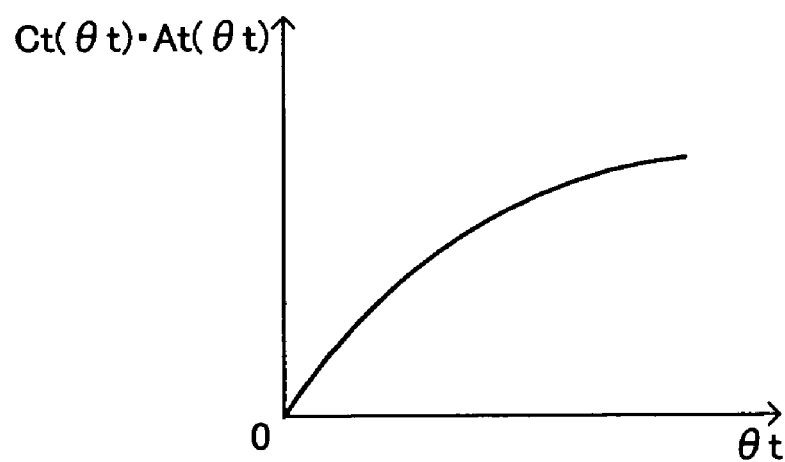
FIG. 10 is a table specifying the relationship between the throttle-valve opening and the product of the flow coefficient and the opening area.

In Eqs. (3) and (4), θt is an estimated throttle-valve opening at time t, which is a predetermined time T0 ahead of the current point of time, as estimated by the electronic-control throttle model M1. The throttle model M2 obtains the flow coefficient Ct(θt) by use of the estimated throttle-valve opening θt and the table of FIG. 8, which specifies the relationship between the throttle-valve opening θt and the flow coefficient Ct(θt); and obtains the opening area At(θt) by use of the estimated throttle valve opening θt and the table of FIG. 9, which specifies the relationship between the throttle-valve opening θt and the opening area At(θt). Notably, the throttle model M2 may be configured so as to obtain the product Ct(θt)·At(θt) at one time by use of the estimated throttle-valve opening θt and the table of FIG. 10, which specifies the relationship between the throttle-valve opening θt and the product Ct(θt)·At(θt), which is the product of the flow coefficient Ct(θt) and the opening area At(θt). The throttle model M2 may also be configured so as to obtain the flow coefficient Ct(θt,Pm) by use of the table MapCt(θt,Pm) specifying the relationship of the flow coefficient Ct(θt,Pm) versus the throttle-valve opening θt and the intake-pipe air pressure Pm, the estimated throttle-valve opening θt, and the intake-pipe air pressure Pm, which is obtained from the intake pipe model M3, which will be described later.

The throttle model M2 acquires the throttle-valve upstream pressure Pa and the intake-air temperature Ta from the atmospheric-pressure sensor 63 and the intake-air temperature sensor 62, respectively; acquires the intake-pipe air pressure Pm and the intake-pipe air temperature Tm from the intake pipe model M3, which will be described later; and calculates Eq. (3) or (4) by use of these obtained values, thereby estimating the throttle-passing air flow rate mt at time t.

The process of deducing Eqs. (3) and (4), which describe the throttle model M2, will be described. When Au represents a cross-sectional opening area as measured upstream of the throttle valve 43; ρu represents the density of air; vu represents the velocity of air; Ad represents the cross-sectional opening area of the intake pipe 41 as measured at the throttle valve 43; pd represents the density of air as observed at the throttle valve 43; and vd represents the velocity of air passing through the throttle valve 43, the throttle-passing air flow rate mt is represented by Eq. (5) shown below. Eq. (5) can be said to express the law of conservation of mass.

$$mt = A_d \cdot \rho_d \cdot v_d = A_u \cdot \rho_u \cdot v_u \tag{5}$$

When m represents the mass of air, kinetic energy is $m \cdot vu^2/2$ as observed upstream of the throttle valve 43, and $m \cdot vd^2/2$ as observed at the throat of the throttle valve 43. Thermal energy is $m \cdot Cp \cdot Tu$ as observed upstream of the throttle valve 43, and $m \cdot Cp \cdot Td$ as observed at the throat of the throttle valve 43. Thus, on the basis of the law of conservation of energy, Eq. (6) shown below is obtained. Notably, Tu is the temperature of air as observed upstream of the throttle valve; Td is the temperature of air as observed downstream of the throttle valve; and Cp is the specific heat at constant pressure.

$$m \cdot vu^2/2 + m \cdot Cp \cdot Tu = m \cdot vd^2/2 + m \cdot Cp \cdot Td \tag{6}$$

Meanwhile, the equation of state is expressed below by Eq. (7); the ratio of specific heat κ is expressed below by Eq. (8); and Mayer's relation is expressed below by Eq. (9). Accordingly, from Eqs. (7) to (9), Cp·T is represented below by Eq. (10). Notably, P is the pressure of gas; ρ is the density of gas; T is the temperature of gas; R is the gas constant; and Cv is the specific heat at constant volume.

$$P = \rho \cdot R \cdot T \tag{7}$$

$$\kappa = Cp/Cv \tag{8}$$

$$Cp = Cv + R \tag{9}$$

$$Cp \cdot T = \{\kappa/(\kappa-1)\} \cdot (P/\rho) \tag{10}$$

Eq. (6), which is obtained on the basis of the law of conservation of energy, is rewritten below as Eq. (11) by use of the relation of Eq. (10).

$$vu^2/2 + \{\kappa/(\kappa-1)\} \cdot (Pu/\rho u) = vd^2/2 + \{\kappa/(\kappa-1)\} \cdot (Pd/\rho d) \tag{11}$$

At a position infinitely upstream of the throttle valve 43, Au=∞ and vu=0. Thus, Eq. (11), which is obtained on the basis of the law of conservation of energy, is rewritten below as Eq. (12).

$$\{\kappa/(\kappa-1)\} \cdot (Pu/\rho u) = vd^2/2 + \{\kappa/(\kappa-1)\} \cdot (Pd/\rho d) \tag{12}$$

Next, momentum will be described. When Pu represents pressure to be applied to a portion of the cross-sectional area Au; Pd represents pressure to be applied to a portion of the cross-sectional area Ad; and Pmean represents a mean pressure of a stationary space extending between the portion of the cross-sectional area Au and the portion of the cross-sectional area Ad, the following Eq. (13) is obtained.

$$\rho d \cdot vd^2 \cdot Ad - \rho u \cdot vu^2 \cdot Au = Pu \cdot Au - Pd \cdot Ad + Pmean \cdot (Ad - Au) \tag{13}$$

In consideration of Au=∞ and vu=0 in Eq. (13), Eq. (14) is obtained as below. From Eqs. (14) and (13), a momentum-related relation (a relation established on the basis of the law of conservation of momentum) as represented below by Eq. (15) is obtained.

$$Pmean = Pu \tag{14}$$

$$\rho d \cdot vd^2 = Pu - Pd \tag{15}$$

From Eqs. (5), (12), and (15), the following Eq. (16) is obtained.

$$m_t = A_d \sqrt{P_u \cdot \rho_u} \sqrt{\left(\frac{P_d}{P_u} + \frac{1}{2}\frac{\kappa-1}{\kappa}\left(1 - \frac{P_d}{P_u}\right)\right)\left(1 - \frac{P_d}{P_u}\right)} \tag{16}$$

In Eq. (16), Pu is the throttle-valve upstream pressure Pa, and Pd is the intake-pipe air pressure Pm. Thus, through introduction of the flow coefficient Ct(θt) (introduction as the coefficient for legitimacy) and substitution of the opening area At(θt) for the cross-sectional opening area Ad, Eq. (16) changes into Eq. (3). The process of deducing Eq. (4) is similar to that for Eq. (3), and thus redundant description thereof is omitted.

(Intake Pipe Model M3)

The intake pipe model M3 obtains (outputs) the intake-pipe air pressure Pm and the intake-pipe air temperature Tm in accordance with Eqs. (17) and (18) below—which are obtained on the basis of the law of conservation of mass and the law of conservation of energy, respectively—and on the basis of the throttle-passing air flow rate mt, the throttle-passing air temperature (i.e., intake-air temperature) Ta, and the air flow rate mc for air flowing out from the intake pipe (i.e., the cylinder intake-air flow rate representing the flow rate of air flowing into the cylinder). In Eqs. (17) and (18), Vm is the volume of a portion of the intake pipe 41 extending between the throttle valve 43 and the intake valve 32 (hereinafter, referred to as merely an "intake pipe portion").

$$d(Pm/Tm)/dt = (R/Vm) \cdot (mt - mc) \tag{17}$$

$$dPm/dt = \kappa \cdot (R/Vm) \cdot (mt \cdot Ta - mc \cdot Tm) \tag{18}$$

The intake pipe model M3 acquires the throttle-passing air flow rate mt, appearing in Eqs. (17) and (18), from the throttle model M2, and acquires the cylinder intake-air flow rate mc, appearing in Eqs. (17) and (18), from the intake valve model M4, which will be described later. The intake pipe model M3 calculates in accordance with Eqs. (17) and (18), thereby obtaining the intake-pipe air pressure Pm at time t and an intake-pipe air temperature Tm at time t.

The process of deducing Eqs. (17) and (18), which describe the intake pipe model M3, will be described. When M represents the total air quantity of the intake pipe portion, a variation with time in total air quantity M is the difference between the throttle-passing air flow rate mt corresponding to the amount of air flowing into the intake pipe portion, and the cylinder intake-air flow rate mc corresponding to the amount of air flowing out from the intake pipe portion. Thus, the following Eq. (19) is obtained on the basis of the law of conservation of mass.

$$dM/dt = mt - mc \tag{19}$$

Meanwhile, since the equation of state is expressed by Eq. (20) given below, elimination of the total air quantity M from Eqs. (19) and (20) yields Eq. (17), which is based on the basis of the law of conservation of mass.

$$Pm \cdot Vm = M \cdot R \cdot Tm \tag{20}$$

Next, the law of conservation of energy will be studied in relation to the intake pipe portion. In this case, the volume Vm of the intake pipe portion remains unchanged, and most of energy is conceivably exploited for temperature increase (kinetic energy is negligible). Since a variation with time in the energy M·Cv·Tm of air in the intake pipe portion is equal to the difference between the energy Cp·mt·Ta of air flowing into the intake pipe portion and the energy Cp·mc·Tm of air flowing out from the intake pipe portion, the following Eq. (21) is obtained.

$$d(M \cdot Cv \cdot Tm)/dt = Cp \cdot mt \cdot Ta - Cp \cdot mc \cdot Tm \qquad (21)$$

Modifying Eq. (21) by use of Eq. (8) (κ=Cp/Cv) and Eq. (20) (Pm·Vm=M·R·Tm) yields Eq. (18).

(Intake Valve Model M4)

The intake valve model M4 estimates the flow rate of air passing around the intake valve 32 (i.e., cylinder intake-air flow rate) mc in accordance with Eqs. (22) and (23) below, which are obtained on the basis of the law of conservation of energy, the law of conservation of momentum, the law of conservation of mass, the equation of state, and the like. The process of deducing Eqs. (22) and (23) is similar to that in the case of the above-described throttle model M2. In Eqs. (22) and (23), Cv(L) is the flow coefficient, which varies with the lift L of the intake valve 32; Av(L) is the area of opening that is formed around the intake valve 32 and varies with the lift L of the intake valve 32; and Pc is cylinder pressure (pressure Pc within the cylinder 21). The intake valve model M4 uses Eq. (22) in the case of regular flow where the intake-pipe air pressure Pm is higher than the cylinder pressure Pc, and uses Eq. (23) in the case of reverse flow where the intake-pipe air pressure Pm is lower than the cylinder pressure Pc.

$$m_c = C_v(L) A_v(L) P_m \sqrt{\frac{\kappa+1}{2\kappa RT_m}} \sqrt{\left(\frac{\kappa}{\kappa+1}\right)^2 - \left(\frac{P_c}{P_m} - \frac{1}{\kappa+1}\right)^2} \qquad (22)$$

$$m_c = C_v(L) A_v(L) P_c \sqrt{\frac{\kappa+1}{2\kappa RT_c}} \sqrt{\left(\frac{\kappa}{\kappa+1}\right)^2 - \left(\frac{P_m}{P_c} - \frac{1}{\kappa+1}\right)^2} \qquad (23)$$

Figure 11:
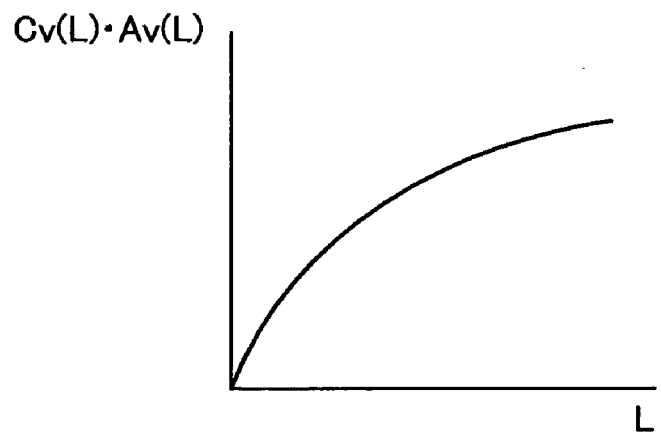
FIG. 11 is a table specifying the relationship between a valve lift and the product of the flow coefficient and the opening area.

The intake valve model M4 estimates the valve lift L(t) at time t, which is a predetermined time T0 ahead of the current point of time, on the basis of the current valve lift L detected by the sensor 67 and the engine speed Ne. The intake valve model M4 obtains the product Cv(L)·Av(L) to be used in Eqs. (22) and (23), on the basis of the table of FIG. 11, which specifies the relationship between the valve lift L and the product Cv(L)·Av(L), and the estimated valve lift L(t).

The intake valve model M4 acquires the intake-pipe air pressure Pm and the intake-pipe air temperature Tm from the intake-pipe model M3; acquires the cylinder pressure Pc and the cylinder temperature Tc from the cylinder model M5, which will be described later; and calculates Eq. (22) or (23) by use of these obtained values, thereby estimating the cylinder intake-air flow rate mc at time t.

(Cylinder Model M5)

Figure 12:
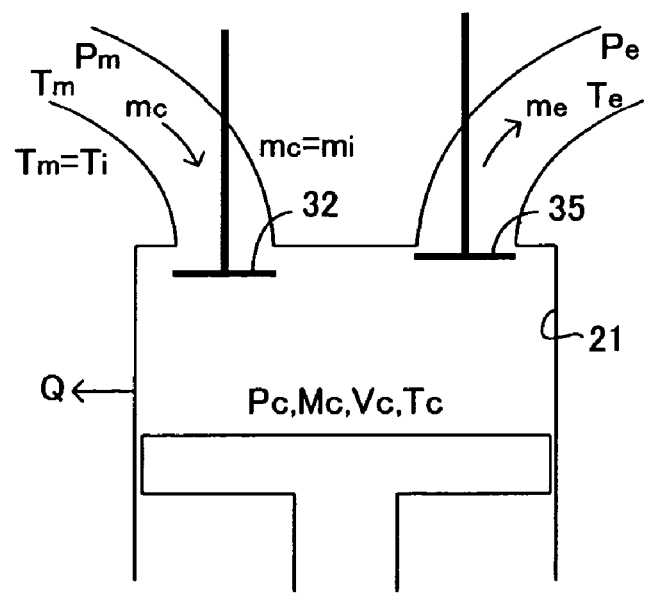
FIG. 12 is a schematic view showing a cylinder and its periphery for explaining variables to be used for representing a cylinder model.

The cylinder model M5 obtains (outputs) the cylinder pressure Pc and the cylinder air temperature Tc in accordance with Eq. (24) below, which is obtained on the basis of the law of conservation of energy in relation to the cylinder 21. As shown in FIG. 12, in Eq. (24), Vc is the volume of the cylinder 21; Tm is an intake-pipe air temperature, which is equal to the temperature Ti of air flowing into the cylinder 21; mc is the flow rate of air flowing out from the intake-pipe portion, which is equal to the air flow rate mi of air flowing into the cylinder 21; and Q is a heat quantity (a variation in heat quantity with time, or the flow of heat) to be transmitted between the cylinder 21 and the exterior of the cylinder 21 (the cylinder wall surface, the intake port, and the like).

$$\frac{dP_c}{dt} = \frac{\kappa RT_m}{V_c} m_c - \frac{\kappa P_c}{V_c} \frac{dV_c}{dt} + (\kappa - 1) \frac{Q}{V_c} \qquad (24)$$

The cylinder intake-air flow rate mc at time t in Eq. (24) is acquired from the intake valve model M4 (Eq. (22) or (23)); and the intake-pipe air temperature Tm at time t in Eq. (24) is acquired from the intake pipe model M3. The cylinder volume Vc at time t can be known on the basis of the crank angle. Thus, when the third term (the term of heat quantity) of the right-hand side of Eq. (24) is neglected, the cylinder pressure Pc at time t can be theoretically obtained by use of Eq. (24).

The process of deducing Eq. (24) will be described. First, when E represents energy within the cylinder, h represents enthalpy, and W represents work to be performed on the piston, the following Eq. (25) can be obtained on the basis of the law of conservation of energy in relation to the cylinder 21.

$$dE/dt = mc \cdot h - dW/dt + Q \qquad (25)$$

When u represents internal energy, Eq. (26) below holds. The equation of state is expressed below by Eq. (27). On the basis of Eq. (8) (K=Cp/Cv), which is the expression of the ratio of specific heat κ, and Eq. (9) (Cp=Cv+R), which is a Mayer's relational expression, Eqs. (28) and (29) given below hold. Notably, Mcy is an air quantity within the cylinder 21.

$$u = Cv \cdot Tc \qquad (26)$$

$$Mcy \cdot Tc = Pc \cdot Vc/R \qquad (27)$$

$$Cv = R/(\kappa-1) \qquad (28)$$

$$Cp = \kappa \cdot R/(\kappa-1) \qquad (29)$$

From Eqs. (26) to (28), the following Eq. (30) holds for the left-hand side dE/dt of Eq. (25).

$$\frac{dE}{dt} = \frac{d(Mcy \cdot u)}{dt} \qquad (30)$$
$$= \frac{d(Mcy \cdot Cv \cdot Tc)}{dt}$$
$$= \frac{d\{Pc \cdot Vc/(\kappa-1)\}}{dt}$$

From Eq. (29) and the definition of enthalpy given below by Eq. (31), the following Eq. (32) holds for the first term mc·h of the right-hand side of Eq. (25).

$$h = Cp \cdot Tm \qquad (31)$$

$$mc \cdot h = mc \cdot \{\kappa \cdot R/(\kappa-1)\} \cdot Tm \qquad (32)$$

Since the work W is expressed below by Eq. (33), the following Eq. (34) holds for the second term dW/dt of the right-hand side of Eq. (25).

$$dW = Pc \cdot dVc \qquad (33)$$

$$dW/dt = Pc \cdot dVc/dt \qquad (34)$$

By use of Eqs. (30), (32), and (34), Eq. (25) is rewritten as Eq. (24).

The cylinder model M5 obtains the cylinder air temperature Tc in accordance with Eq. (35) below, which is the equation of state. Mc1 in Eq. (35) is obtained by integrating the cylinder intake-air flow rate mc of Eq. (22) or (23) over a period of time ranging from opening of the intake valve 32 to a point of time when the cylinder air temperature Tc is to be obtained.

$$Tc = (Pc \cdot Vc)/(Mc1 \cdot R) \tag{35}$$

According to the above-described principle, the cylinder pressure Pc and the cylinder air temperature Tc are obtained in accordance with Eq. (24) of the cylinder model M5 and Eq. (35), respectively. On the basis of the obtained pressure Pc and temperature Tc, the cylinder intake-air flow rate mc is obtained in accordance with Eqs. (22) and (23). Thus, the fuel injection quantity control apparatus estimates the cylinder intake-air quantity Mc (total intake-air quantity Smc) indicative of the amount of air flowing into the cylinder 21 in a single intake stroke through integration of the cylinder intake-air air flow rate mc over a period of time ranging from time t0 when the intake valve 32 opens, to time tf when the intake valve 32 closes. On the basis of the estimated value Mc and the above-described Eq. (2), the fuel injection quantity control apparatus determines the fuel injection quantity fc.

(Improvement in Relation to Incorporation into Electric Control Device 80)

Since the heat transmission quantity Q in the third term of the right-hand side of Eq. (24) is small and negligible, Eq. (24) is usually incorporated into the electric control device 80 in a discrete-system form as represented by Eq. (36) below. In Eq. (36), Δt is a time interval for calculation of the cylinder pressure Pc.

$$P_{c(t+\Delta t)} = P_{c(t)} + \left( \frac{\kappa RT_m}{V_c} m_c - \frac{\kappa P_c}{V_c} \frac{dV_c}{dt} \right) \Delta t \tag{36}$$

Figure 13:
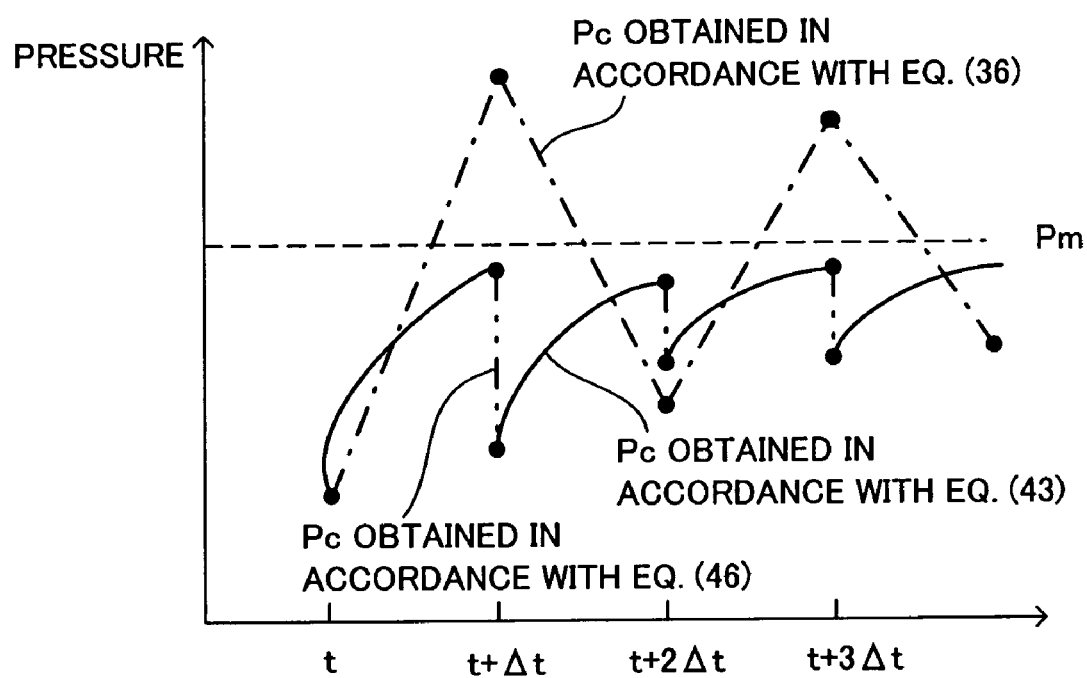
FIG. 13 is a time chart for explaining the results of calculating a cylinder pressure by use of the cylinder model.

However, as represented by the dot-and-dash line of FIG. 13, the cylinder pressure Pc obtained by the above method has been found to vary greatly due to employment of a discrete-system form, resulting in a great deviation from an actual value. Thus, in the present embodiment, the value Q in the third term of the right-hand side of Eq. (24) is neglected; and for the sake of convenience, Eq. (24) is analytically solved on each of the assumptions (1) the volume of the cylinder is constant (dVc=0) and (2) the cylinder intake-air flow rate is 0(mc=0), thereby obtaining the cylinder pressure Pc for each case. This will be described in detail.

(1) Assumption That the Volume of the Cylinder is Constant (dVc=0)

On this assumption, Eq. (24) becomes a differential equation represented below by Eq. (37). Solving Eq. (37) yields the following Eq. (38).

$$\frac{dP_c}{dt} = \frac{\kappa RT_m}{V_c} m_c \tag{37}$$

-continued $$P_c(t) = \frac{\kappa P_m}{\kappa+1} \left( \frac{1}{\kappa} + \cos\left( \theta_0 - \frac{\kappa+1}{P_m} \sqrt{\frac{\kappa}{2(\kappa+1)}} \frac{RT_m}{V_c} A_v \sqrt{P_m \rho_m} \, t \right) \right) \tag{38}$$

In Eq. (38), $\theta_0 = \cos^{-1}(I)$. Eq. (38) shows that the cylinder pressure Pc varies in the form of a sine wave. Meanwhile, Euler's approximation of Eq. (37) yields the following Eq. (39):

$$P'_c(t+\Delta t) = P_c(t) + \frac{m_c \kappa RT_m}{V_c} \Delta t \tag{39}$$

Since the cylinder pressure Pc is never higher than the intake-pipe air pressure Pm, Eq. (40) below holds. Thus, from Eqs. (39) and (40), the following Eq. (41) holds.

$$Pc(t+\Delta t) \leq Pm \tag{40}$$

$$\frac{\kappa RT_m m_c}{V_c} \Delta t \leq P_m - P_c(t) \tag{41}$$

Furthermore, when θ is extremely smaller than 1 (θ<<1), Eq. (42) below holds. Thus, application of Eqs. (41) and (42) to Eq. (39) yields Eq. (43) below. Notably, the cylinder intake-air flow rate mc in Eq. (43) is obtained in accordance with Eqs. (22) and (23).

$$\sin(\theta) \approx \theta \tag{42}$$

$$P'_c(t+\Delta t) = P_c(t) + (P_m - P_c(t)) \sin\left( \frac{m_c \kappa RT_m}{V_c(P_m - P_c(t))} \Delta t \right) \tag{43}$$

(2) Assumption That the Cylinder Intake-Air Quantity is Zero (mc=0)

On this assumption, Eq. (24) becomes a differential equation represented below by Eq. (44). Since this case can be handled as an adiabatic-expansion case, the following Eq. (45) holds.

$$\frac{dP_c}{dt} = -\frac{\kappa P_c}{V_c} \frac{dV_c}{dt} \tag{44}$$

$$P_c V_c^\kappa = \text{constant} \tag{45}$$

Thus, the following Eq. (46) is deduced.

$$P_c(t+\Delta t) = P'_c(t) \left( \frac{V_c(t)}{V_c(t+\Delta t)} \right)^\kappa \tag{46}$$

The cylinder pressure Pc obtained in accordance with Eq. (43) and that obtained in accordance with Eq. (46) are represented by the solid line and the two-dot-and-dash line, respectively, in FIG. 13. Conceivably, the cylinder pressure Pc approximates to the intake-pipe air pressure Pm. Thus, the present embodiment employs the cylinder pressure P'c (t), which is obtained in accordance with Eq. (43) and approximates to the intake-pipe air pressure Pm to a greater extent, as the cylinder pressure Pc to be obtained finally.

As mentioned above, the cylinder intake-air quantity Mc in a single intake stroke is obtained through integration of the cylinder intake-air flow rate mc represented by Eq. (22) or (23) over a period of time ranging from time t0 when the intake valve 32 opens, to time tf when the intake valve 32 closes. However, simulation results have revealed that the cylinder intake-air quantity Mc is obtained with higher accuracy in accordance with Eq. (47) below—an expression obtained through integration of Eq. (24), which is obtained on the basis of the law of conservation of energy, over a period of time ranging from time t0 to time tf. Notably, Pc(t0) and Vc(t0) are the cylinder pressure Pc(t) and the cylinder volume Vc(t), respectively, at intake-valve-opening time; and Pc(tf) and Vc(tf) are the cylinder pressure Pc(t) and the cylinder volume Vc(t), respectively, at intake-valve-closing time.

$$M_c = \frac{\frac{1}{\kappa}(P_c(t_f)V_c(t_f) - P_c(t_o)V_c(t_o)) + \frac{\kappa-1}{\kappa}\int_{t_o}^{t_f} P_c \frac{dV_c}{dt} dt}{RT_m} \qquad (47)$$

Thus, the present embodiment obtains the cylinder intake-air quantity Mc in accordance with the following Eq. (48), which is a discrete-system expression of Eq. (47).

$$M_c = \frac{\frac{1}{\kappa}(P_c(t_f)V_c(t_f) - P_c(t_o)V_c(t_o)) + \frac{\kappa-1}{\kappa}\sum_{t_o}^{t_f} P_{c(t)} \frac{dV_c}{dt} \Delta_t}{RT_m} \qquad (48)$$

(Operation)

Next will be described the actual operation of the electric control device 80 in estimation of the cylinder intake-air quantity Mc and determination of the fuel injection quantity fc.

(Throttle Valve Control)

Figure 14:
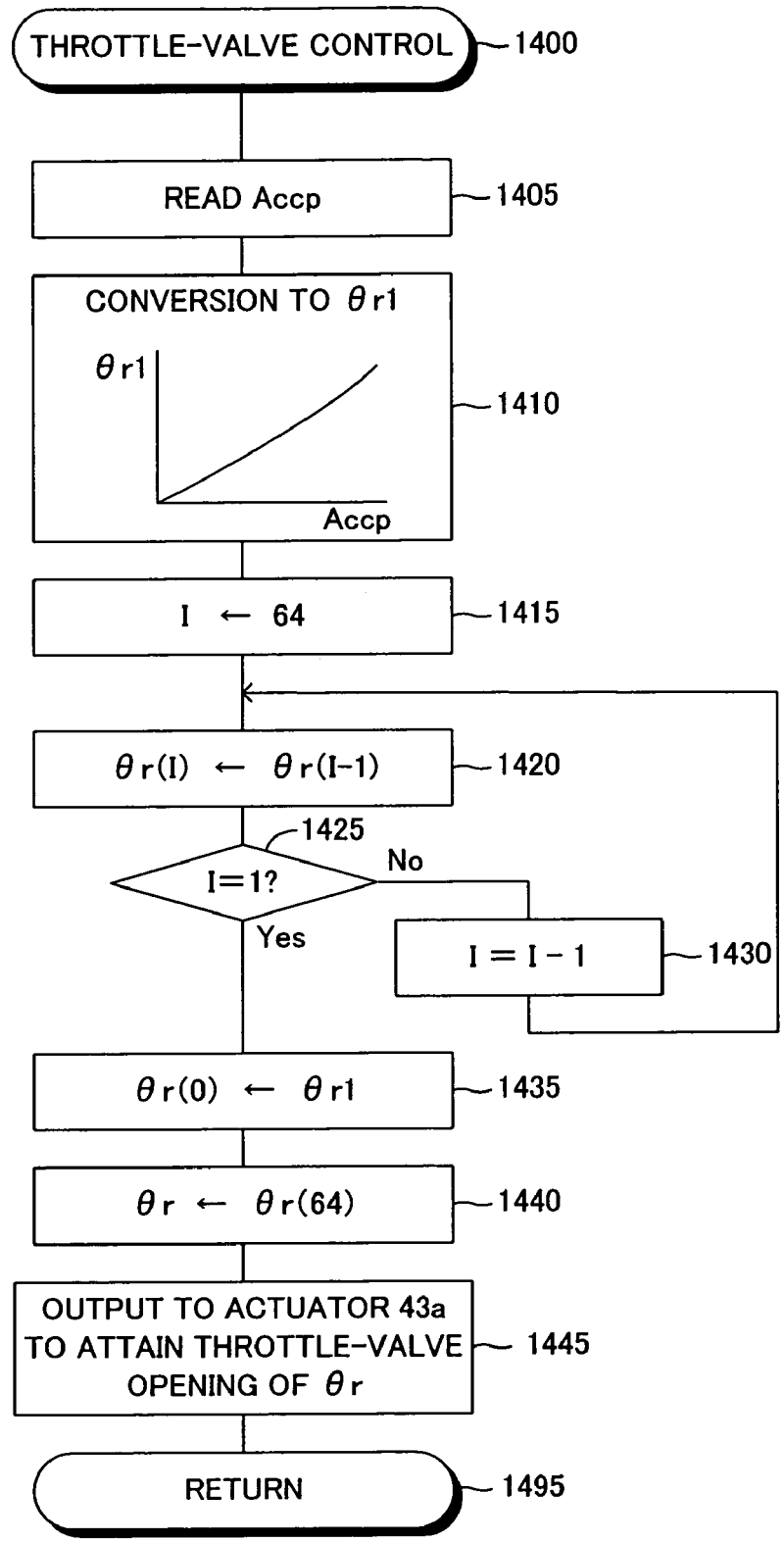
FIG. 14 is a flowchart showing a program (routine) that the CPU shown in FIG. 1 executes.

The CPU 81 of the electric control device 80 executes, every elapse of a predetermined time (1 msec), a routine for controlling the throttle-valve opening as represented by the flowchart of FIG. 14. When predetermined timing is reached, the CPU 81 starts processing from step 1400 and proceeds to step 1405, in which the CPU 81 reads the accelerator pedal travel Accp. Next, the CPU 81 proceeds to step 1410 and obtains the provisional target throttle-valve opening θr1 corresponding to the read accelerator pedal travel Accp by use of a table identical to that of FIG. 7.

Next, the CPU 81 proceeds to step 1415 and sets the variable I to "64". Subsequently, in step 1420, the CPU 81 stores the value of θr(I−1) as the storage value θr(I). At the current point of time, since the variable I is "64," the value of the storage value θr(63) is stored as the storage value θr(64). Next, the CPU 81 proceeds to step 1425 and judges whether or not the variable I is equal to "1." In this case, since the value of the variable I is "64," the CPU 81 forms the "No" judgment in step 1425 and proceeds to step 1430. In step 1430, the CPU 81 decrements the value of the variable I by "1." Subsequently, the CPU 81 returns to step 1420. As a result, when step 1420 is executed, the value of the storage value θr(62) is stored as the storage value θr(63). This process is repeatedly executed until the variable I assumes a value of "1."

Subsequently, when the variable I assumes a value of "1" as a result of repeated execution of the process of step 1430, the CPU 81 forms the "Yes" judgment in step 1425 and proceeds to step 1435. In step 1435, the CPU 81 stores as the storage value θr(0) the current, provisional target throttle-valve opening θr1, which was obtained in step 1410. Thus, the provisional target throttle-valve opening θr(I) (I=64, 63, 62, ..., 2, 1, 0) at a point of time that is I msec (0 msec≦I msec≦64 msec, I is an integer) before the current point of time is stored in the RAM 83.

Next, the CPU 81 proceeds to step 1440 and sets the storage value θr(64) as the final target throttle-valve opening θr. Subsequently, in step 1445, the CPU 81 outputs a drive signal to the throttle valve actuator 43a such that the actual throttle-valve opening becomes equal to the target throttle-valve opening θr. Subsequently, in step 1495, the present routine is ended for the present.

Subsequently, the above-described routine is executed every elapse of 1 msec. As a result, the actual throttle-valve opening is controlled so as to become equal to the target throttle-valve opening θr corresponding to the accelerator pedal travel Accp as observed a predetermined time T (=64 msec) before. Thus, the above-described electronic-control throttle model M1 estimates the target throttle-valve opening θ(T-T0) at a point of time that is a time (T-T0) before the current point of time, to be the throttle-valve opening θt at time t, which is a predetermined time T0 ahead of the current point of time.

(Estimation of Throttle-Passing Air Flow Rate mt, Intake-Pipe Air Pressure Pm, and Intake-Pipe Air Temperature Tm)

Figure 15:
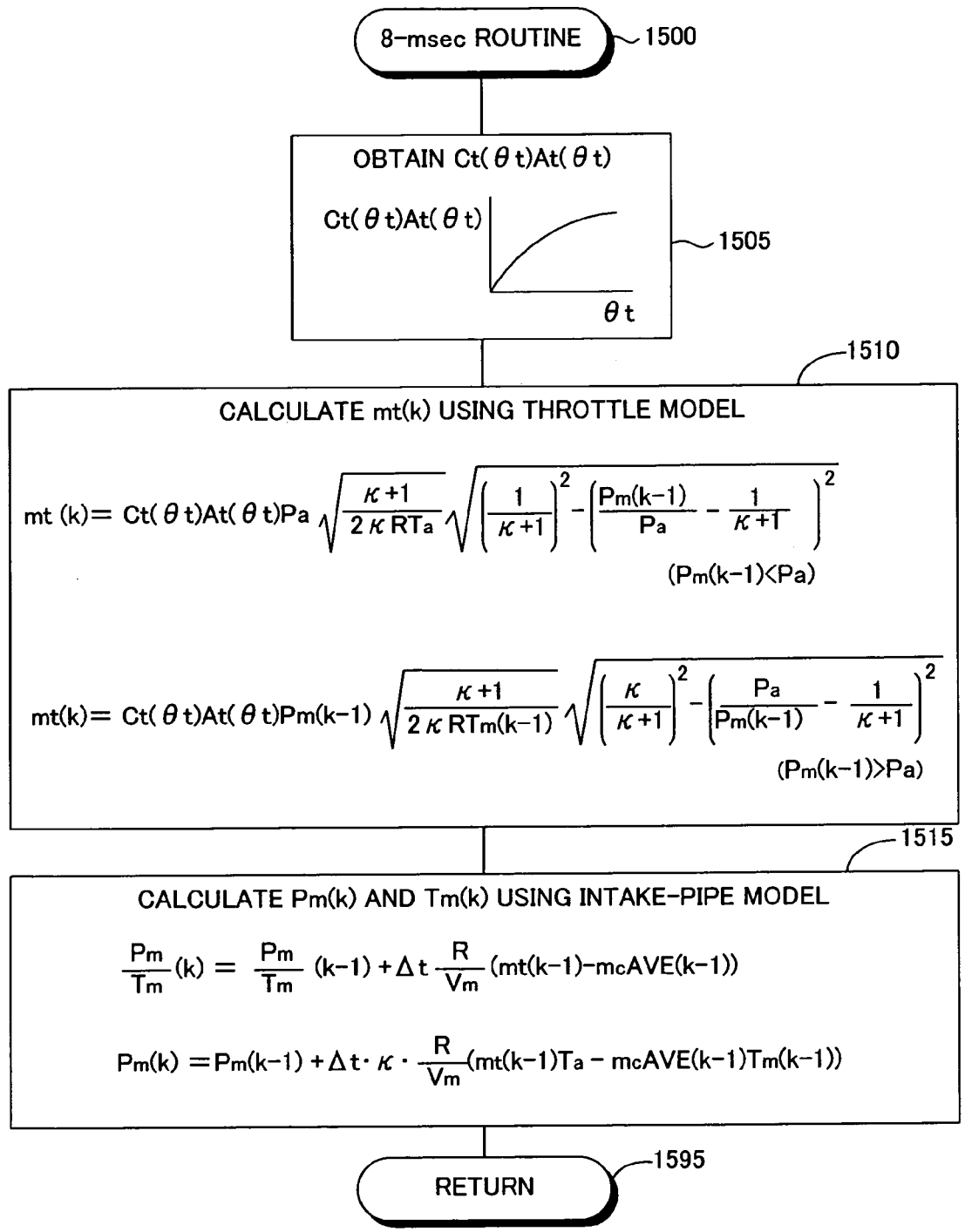
FIG. 15 is a flowchart showing a program (routine) that the CPU shown in FIG. 1 executes.

The CPU 81 executes a routine represented by the flowchart of FIG. 15 every elapse of a predetermined time (8 msec). When predetermined timing is reached, the CPU 81 starts processing from step 1500 and proceeds to step 1505. In step 1505, the CPU 81 obtains the product Ct(θt)·At(θt) of the flow coefficient Ct(θt) and the opening area At(θt) by use of a table identical to that of FIG. 10 and the estimated throttle-valve opening θt at time t, which is a predetermined time T0 ahead of the current point of time.

Next, the CPU 81 proceeds to step 1510 and estimates the throttle-passing air flow rate mt in accordance with Eq. (3) or Eq. (4) (throttle model M2). The throttle-valve upstream pressure Pa and the intake-air temperature Ta to be used in the estimation are obtained from the atmospheric-pressure sensor 63 and the intake-air temperature sensor 62, respectively. The intake-pipe air pressure Pm(k−1) and the intake-pipe air temperature Tm(k−1) are the value Pm(k) and the value Tm(k), respectively, that were obtained in step 1515, which will be described later, in the last execution of the present routine.

Next, the CPU 81 proceeds to step 1515 and obtains the intake-pipe air pressure Pm(k) and the intake-pipe air temperature Tm(k) in accordance with Eqs. (49) and (50) below, which are obtained through integration and discretization of Eqs. (17) and (18), respectively. Notably, a value with the affix (k−1) denotes a value that was obtained in the last execution of the present routine, and Δt is a calculation cycle (i.e., 8 msec) of the present routine.

$$\frac{P_m}{T_m}(k) = \frac{P_m}{T_m}(k-1) + \Delta t \frac{R}{V_m}(m_t(k-1) - m_c AVE(k-1)) \quad (49)$$

$$P_m(k) = \\ P_m(k-1) + \Delta t \kappa \frac{R}{V_m}(m_t(k-1)T_a - m_c AVE(k-1)T_m(k-1)) \quad (50)$$

In actuality, Pm/Tm is obtained in accordance with Eq. (49), and Tm is obtained by use of thus-obtained Pm/Tm and Pm obtained in accordance with Eq. (50). Notably, mcAVE (k-1) appearing in Eqs. (49) and (50) is an average value for the cylinder intake-air flow rate mc obtained through execution of a 1-msec routine, which will be described later.

(Estimation of Cylinder Pressure Pc, Cylinder Intake-Air Flow Rate mc, Cylinder Intake-Air Quantity Mc, and the Like)

Figure 16:
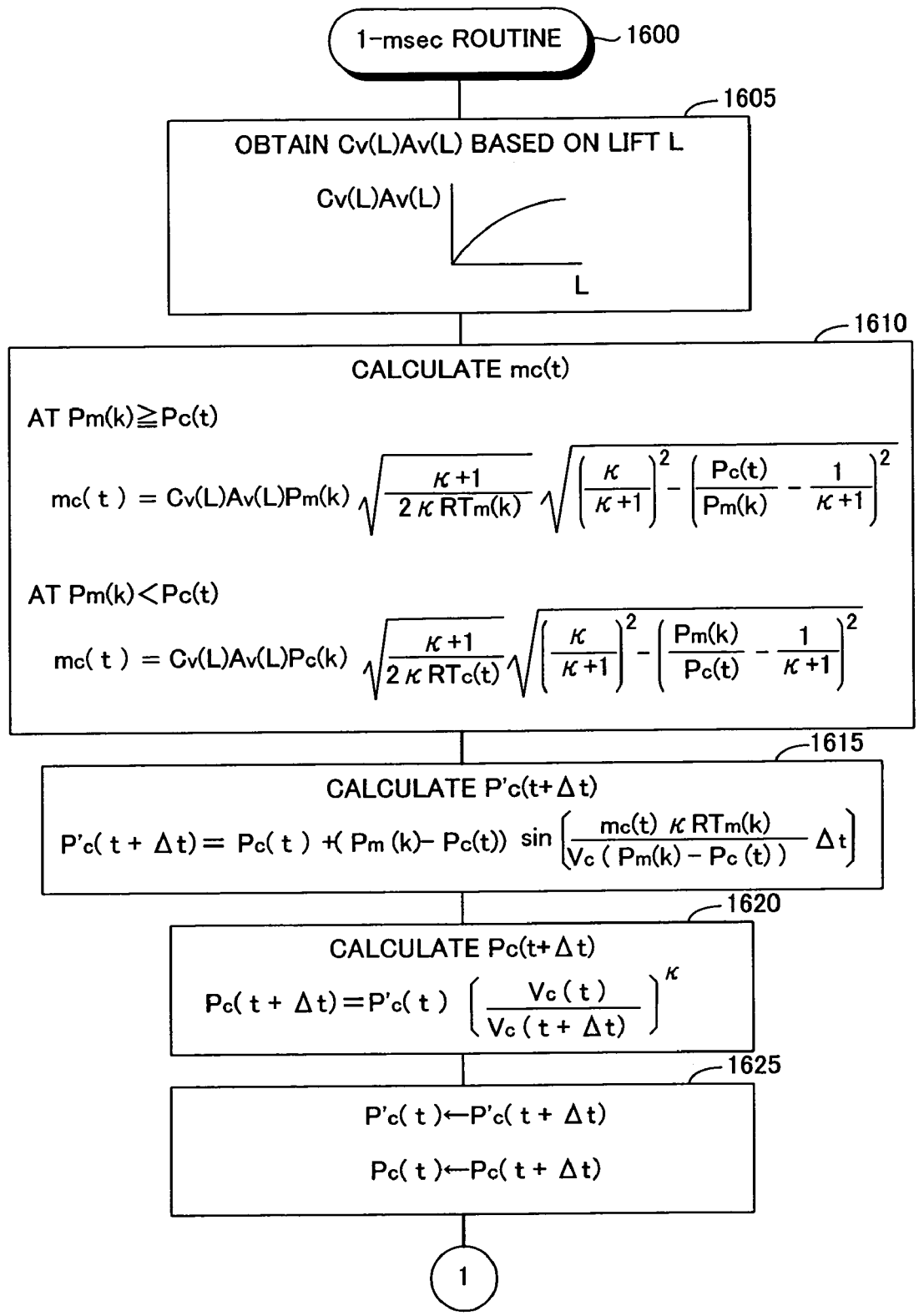
FIG. 16 is a flowchart showing a program (routine) that the CPU shown in FIG. 1 executes.

The CPU 81 executes a routine represented by the flowchart of FIG. 16 every elapse of a predetermined time (1 msec). When predetermined timing is reached, the CPU 81 starts processing from step 1600 and proceeds to step 1605. In step 1605, the CPU 81 obtains the product Cv(L)·Av(L) to be used in Eqs. (22) and (23), on the basis of the valve lift L at the aforementioned time t and a table identical to that of FIG. 11. Subsequently, in step 1610, the CPU 81 calculates the cylinder intake-air flow rate mc(t) in accordance with Eq. (22) or Eq. (23).

Next, the CPU 81 proceeds to step 1615 and obtains the cylinder pressure P'c(t+Δt) in accordance with Eq. (43). Δt is a calculation cycle (i.e., 1 msec) of the present routine. Pm(k) and Tm(k) denote an intake-pipe air pressure and an intake-pipe air temperature, respectively, that have been obtained in the aforementioned step 1515. Pc(t) denotes a value that was set in step 1625, which will be described later, in the last execution of the present routine, and mc(t) denotes a value obtained in the aforementioned step 1610.

Next, the CPU 81 proceeds to step 1620 and obtains the cylinder pressure Pc(t+Δt) in accordance with Eq. (46). Subsequently, in step 1625, the CPU 81 stores the obtained cylinder pressure P'c(t+Δt) and the obtained cylinder pressure Pc(t+Δt) as the cylinder pressure P'c(t) and the cylinder pressure Pc(t), respectively, for the next execution of the present routine.

Figure 17:
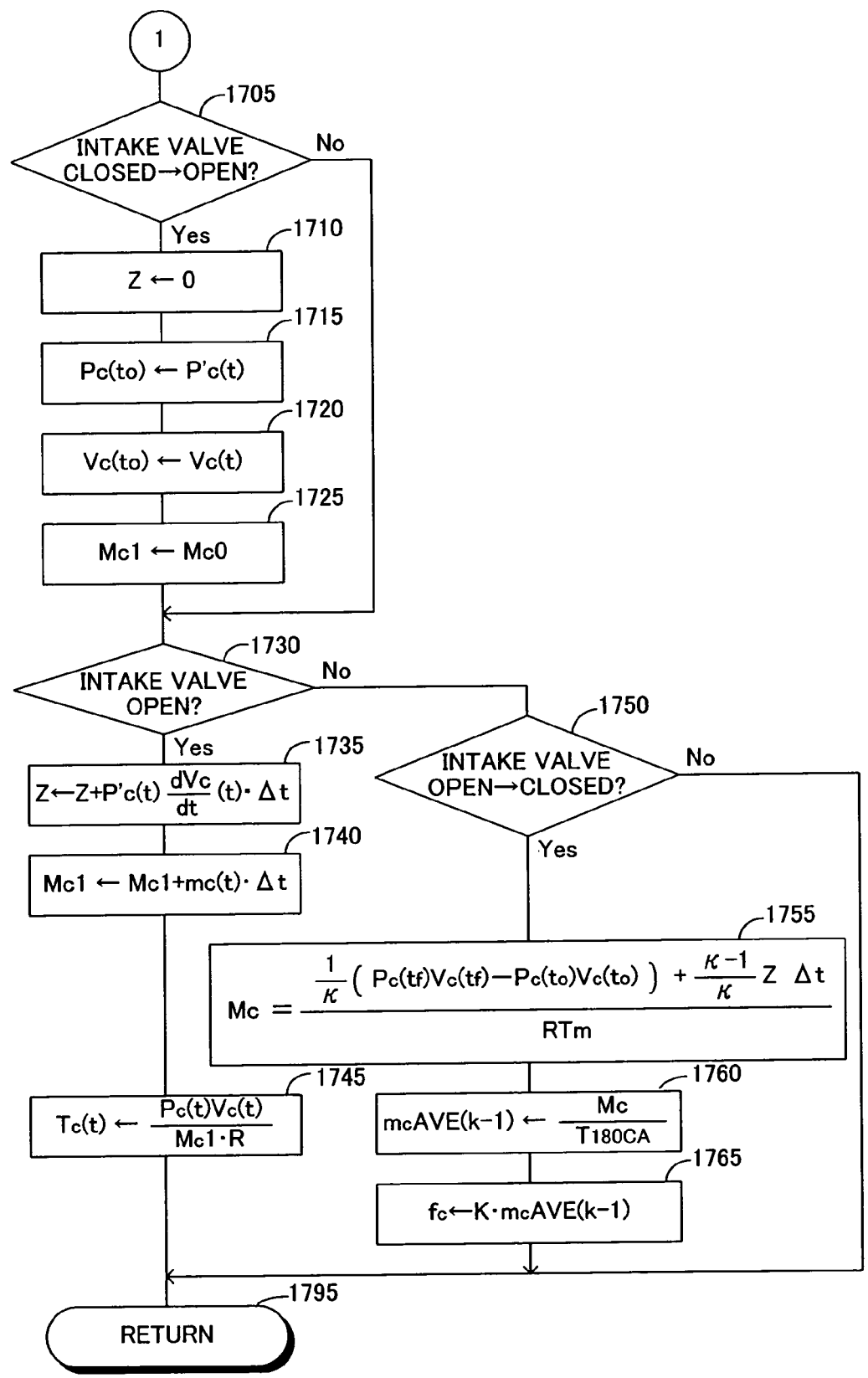
FIG. 17 is a flowchart showing a program (routine) that the CPU shown in FIG. 1 executes.

Next, the CPU 81 proceeds to step 1705 shown in FIG. 17 and judges whether or not time t is immediately after the intake valve 32 has changed its state from the closed state to the open state. If time t is immediately after the change from the closed state to the open state, then in step 1710 the CPU 81 initializes the variable Z to "0." In step 1715, the CPU 81 stores the currently obtained cylinder pressure Pc'(t) as the cylinder pressure Pc(t0) at the time when the intake valve 32 opens (at intake-valve-opening time). In step 1720, the CPU 81 stores the cylinder volume Vc(t) at time t as the cylinder volume Vc(t0) at intake-valve-opening time. Subsequently, in step 1725, the CPU 81 sets the cylinder intake-air quantity Mc1 accumulated from intake-valve-opening time, to Mc0 (an initial value; e.g., "0"). Then, the CPU 81 proceeds to step 1730. Meanwhile, if time t is not immediately after the intake valve 32 has changed its state from the closed state to the open state, then the CPU 81 forms the "No" judgment in step 1705 and proceeds directly to step 1730.

Next, in step 1730, the CPU 81 judges whether or not the intake valve 32 is in the open state at time t. If time t is immediately after the intake valve 32 has changed its state from the closed state to the open state, then in step 1730 the CPU 81 forms the "Yes" judgment and proceeds to step 1735. In step 1735, the CPU 81 adds the value Pc'(t)·dVc (t)/dt·Δt to the variable Z to thereby update the variable Z. Thus, the variable Z assumes the equivalent of an integration value of the value P'(t)·dVc(t)·dt. Subsequently, in step 1740, the CPU 81 stores the sum of the cylinder intake-air quantity Mc1 accumulated from intake-valve-opening time and mc(t)·Δt as a new cylinder intake-air quantity Mc1. The CPU 81 proceeds to step 1745 and obtains the cylinder air temperature Tc(t) in accordance with Eq. (51) below. Subsequently, in step 1795, the present routine is ended for the present.

$$Tc(t) = Pc(t) \cdot Vc(t)/(Mc1 \cdot R) \quad (51)$$

Since, while the intake valve 32 is open, processing from steps 1730 to 1745 continues; thus, updating continues with respect to the variable Z indicative of the total sum of the value P'(t)·dVc(t)/dt·Δt, the cylinder intake-air quantity Mc1 accumulated from intake-valve-opening time, and the cylinder air temperature Tc(t).

Subsequently, when a predetermined time elapses, and a point of time immediately after the intake valve 32 has changed its state from the open state to the closed state is reached, the CPU 81 forms the "No" judgment in steps 1705 and 1730 and proceeds to step 1750. In step 1750, the CPU 81 judges whether or not the intake valve 32 has just changed its state from the open state to the closed state. In this case, in step 1750, the CPU 81 forms the "Yes" judgment and proceeds to step 1755. In step 1755, the CPU 81 estimates the cylinder intake-air quantity Mc in a single intake stroke in accordance with the above-described Eq. (48).

Subsequently, the CPU 81 proceeds to step 1760 and divides the above-obtained cylinder intake-air quantity Mc by the time $T_{180CA}$ corresponding to the crank angle 180° CA, thereby obtaining the average value mcAVE(k-1) for the cylinder intake-air quantity Mc. Subsequently, in step 1765, the CPU 81 multiplies the average value mcAVE(k-1) for the cylinder intake-air quantity Mc by the coefficient K, which varies with the set air-fuel ratio, thereby obtaining the fuel injection quantity fc. Notably, since the average value mcAVE(k-1) for the cylinder intake-air quantity Mc is proportional to the cylinder intake-air quantity Mc, the fuel injection quantity fc is calculated in accordance with Eq. (2). Then, the CPU 81 proceeds to step 1795 and ends the present routine for the present. Notably, the fuel injection quantity fc may be directly obtained by multiplying the cylinder intake-air quantity Mc by a constant.

In the case where time t is not immediately after the intake valve 32 has changed its state from the closed state to the open state; and is when the intake valve 32 is in the closed state, after performing processing from steps 1600 to 1625 of FIG. 16, the CPU 81 forms the "No" judgment in all steps 1705, 1730, and 1750 of FIG. 17 and proceeds to step 1795. In step 1795, the CPU 81 ends the present routine for the present.

As described above, the cylinder intake-air quantity Mc is estimated by use of the cylinder model, and the corresponding fuel injection quantity fc is determined. The CPU 81 executes an unillustrated fuel injection routine according to predetermined timing, thereby causing fuel to be injected by the above-determined fuel injection quantity fc.

As described above, according to the first embodiment of the fuel injection quantity control apparatus according to the present invention, the cylinder model M5 obtains the cylinder pressure Pc and the cylinder air temperature Tc and supplies the obtained values to the intake-valve model M4.

Accordingly, the intake-valve model M4 can obtain the cylinder intake-air flow rate mc (thus, the cylinder intake-air quantity Mc) through numerical calculation in accordance with Eqs. (22) and (23) without use of conventionally practiced table searches involving a number of variables. As a result, labor required for legitimacy check on table values can be reduced, and the fuel injection quantity fc can be obtained with high accuracy.

(Modification Employing Observer)

Figure 18:
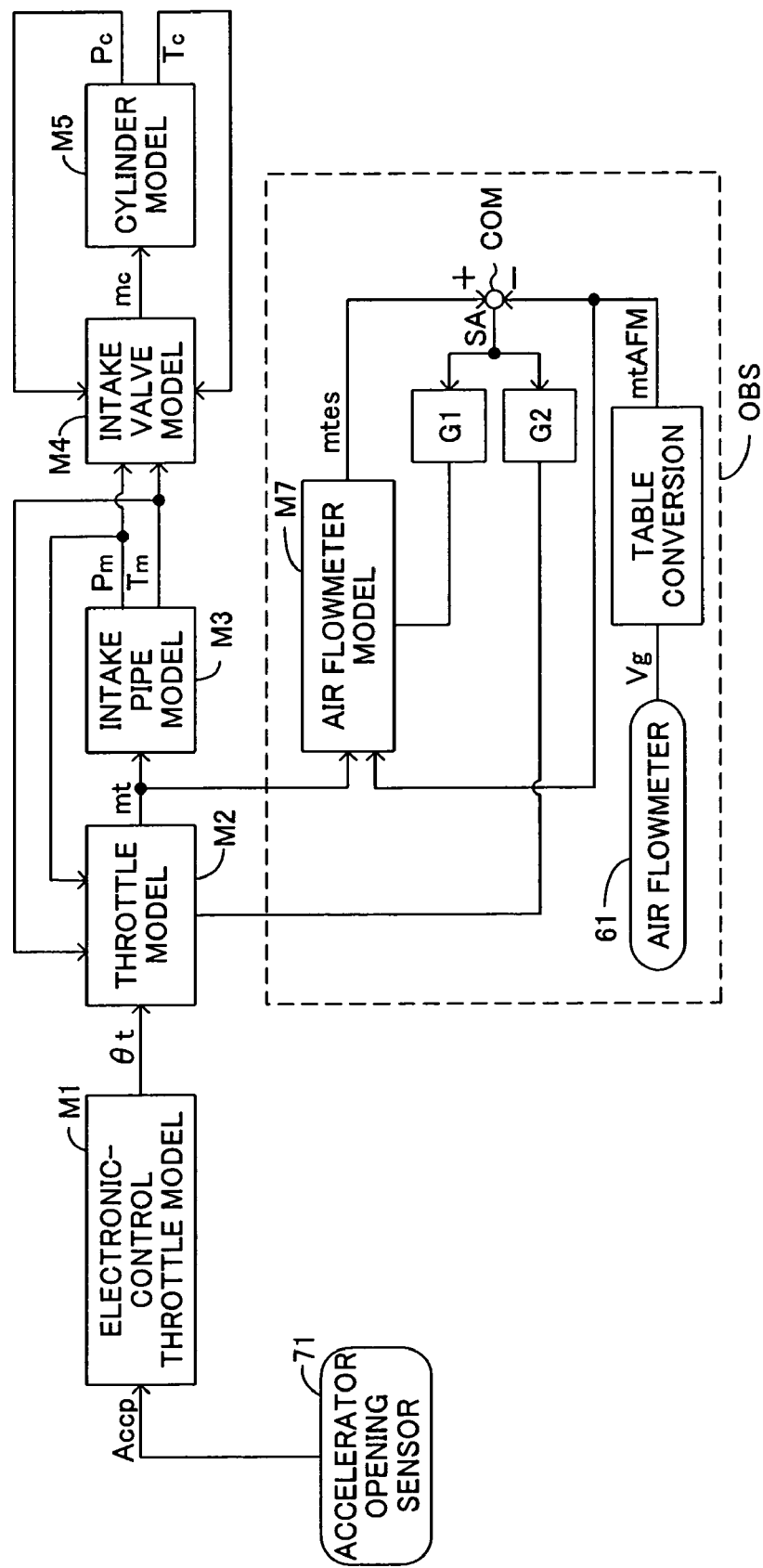
FIG. 18 is a functional block diagram showing a modification of the first embodiment of the fuel injection quantity control apparatus (intake-air quantity estimation apparatus) according to the first embodiment of the present invention.

Next, a modification of the fuel injection quantity control apparatus (cylinder intake-air quantity estimation apparatus) according to the present invention will be described with reference to FIG. 18. The modification additionally employs an observer OBS, thereby enhancing estimation accuracy for the cylinder intake-air quantity Mc. In FIG. 18, the section enclosed by the dashed line is the observer OBS.

The modification is configured such that an air flowmeter model M7 is added to the above-described first embodiment. The air flowmeter model M7 estimates a value that an air flowmeter 61 is to output when the throttle-passing air flow rate is a predetermined flow rate α. On the basis of the estimated value, the air flowmeter model M7 estimates the throttle-passing air flow rate mtes. In this case, the predetermined flow rate α is a throttle-passing air flow rate mt estimated by the throttle model M2. An output from the air flowmeter model M7 is input to one end of a comparison element COM.

In the present modification, an output Vg from the air flowmeter 61 is converted to the intake-air flow rate mtAFM in accordance with the table of FIG. 5, and the intake-air flow rate mtAFM is input to the other end of the comparison element COM. The comparison element COM obtains the difference SA between the throttle-passing air flow rate mtes and the intake-air flow rate mtAFM. The modification is configured such that the gain G1 of the air flowmeter model M7 and the gain G2 of the throttle-model M2 are modified in such a manner as to reduce the difference SA (i.e., in accordance with the difference SA).

The air flowmeter model M7 will be specifically described. The air flowmeter model M7 first obtains complete heat release quantities W1 and W2 for the throttle-passing air flow rate mt on the basis of a table specifying the relationship between the throttle-passing air flow rate mt and the complete heat release quantities W1 and W2, and the above-obtained throttle-passing air flow rate mt. The complete heat release quantity W1 is a heat release quantity that does not include a heat release delay corresponding to the bobbin portion 61a1 of the hot-wire measuring portion 61a shown in FIG. 3, and the complete heat release quantity W2 is a heat release quantity that does not include a heat release delay corresponding to the support portion 61a2 of the hot-wire measuring portion 61a.

Next, the air flowmeter model M7 obtains heat release quantities (response heat release quantities) w1 and w2 in accordance with undermentioned Eqs. (52) and (53), respectively. The heat release quantities w1 and w2 correspond to the bobbin portion 61 a1 and the support portion 61a2, respectively, and have a primary delay characteristic (include a response delay) in relation to the complete heat release quantities W1 and W2, respectively. In Eqs. (52) and (53), the affix i denotes a current calculation value; the affix i−1 denotes the last calculation value; and Δt denotes a period of time between obtainment of the last calculation value and obtainment of the current calculation value.

$$w1_i = \Delta t \cdot (W1_{i-1} - w1_{i-1})/\tau 1 + w1_{i-1} \quad (52)$$

$$w2_i = \Delta t \cdot (W2_{i-1} - w2_{i-1})/\tau 2 + w2_{i-1} \quad (53)$$

In Eqs. (52) and (53), τ1 is a time constant of the above-mentioned primary delay characteristic corresponding to the bobbin portion 61a1, and τ2 is a time constant of the primary delay characteristic corresponding to the support portion 61a2. τ1 and τ2 are obtained in accordance with undermentioned Eqs. (54) and (55), respectively. In Eqs. (54) and (55), the values k10 and k20 and the values m1 and m2 assume experimentally determined respective values, which are provided as initial values. In Eqs. (54) and (55), the value u is a passing air quantity per unit cross-sectional area of a bypass passage of the hot-wire measuring portion 61a of the air flowmeter 61, and is a value (mtAFM/S) obtained by dividing the intake-air flow rate mtAFM— which is obtained on the basis of the actual output voltage Vg of the air flowmeter 61 and the Vg-mtAFM conversion table of FIG. 5 specifying the relationship between the output voltage Vg of the air flowmeter 61 and the measured intake-air flow rate mtAFM—by the cross-sectional area S of the bypass passage of the hot-wire portion measuring 61a.

$$\tau 1 = k10 \cdot u^{m1} \quad (54)$$

$$\tau 2 = k20 \cdot u^{m2} \quad (55)$$

Figure 19:
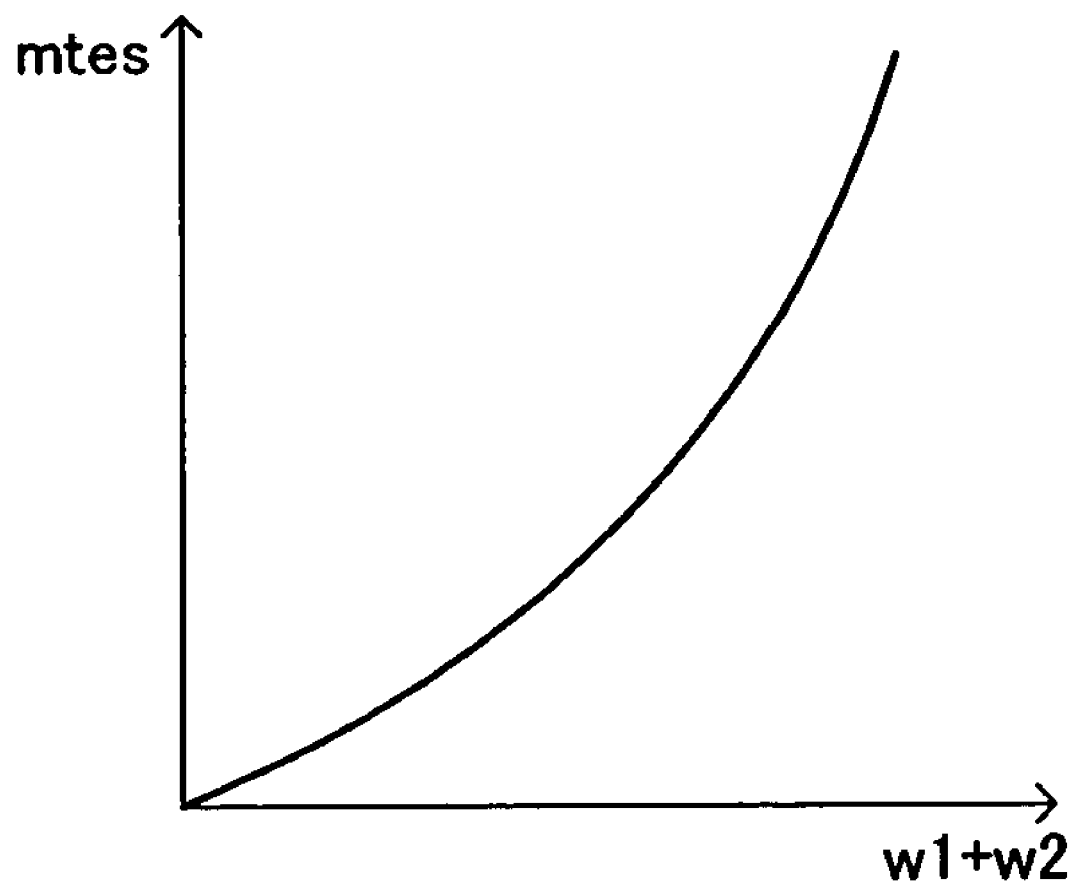
FIG. 19 is a table specifying the relationship between the sum of response heat release quantities, and a throttle-passing air flow rate determined on the basis of a value to be output from the air flowmeter, the table being referenced by the CPU shown in FIG. 1.

The air flowmeter model M7 obtains the throttle-passing air flow rate mtes predicated on a value that the air flowmeter 61 is to output at the current point of time, on the basis of the table of FIG. 19 specifying the relationship between the sum (w1+w2) of the response heat release quantities w1 and w2, and the throttle-passing air flow rate mtes predicated on a value that the air flowmeter 61 is to output, as well as on the basis of the sum (w1+w2) of the response heat release quantities w1 and w2 obtained in accordance with Eqs. (52) to (55).

In the air flowmeter model M7 of the present modification, for example, the time constants τ1 and τ2 to be used in Eqs. (52) and (53) are adjusted in accordance with the output SA of the comparison element COM. In other words, the values k10 and k20 and the value m1 and m2 in Eqs. (54) and (55) are modified in such a manner as to decrease the output SA of the comparison element COM. This means that the gain G1 shown in FIG. 18 is modified in accordance with the output SA.

Next will be described adjustment of the gain G2 of the throttle model M2 on the basis of the output SA. The throttle-passing air flow rate mt is expressed by Eq. (3). When the functions f1 and f2 are defined as expressed by Eqs. (56) and (57) below, Eq. (3) is rewritten below as Eq. (58).

$$f1 = P_a \sqrt{\frac{\kappa + 1}{2\kappa R T_a}} \quad (56)$$

$$f2(P_m) = \sqrt{\left(\frac{\kappa}{\kappa+1}\right)^2 - \left(\frac{P_m}{P_a} - \frac{1}{\kappa+1}\right)^2} \quad (57)$$

$$mt = Ct(\theta t) At(\theta t) f1 \, f2(Pm) \quad (58)$$

Differentiation of Eq. (58) yields the following Eq. (59):

$$\frac{dmt}{dt} = f_1 At(\theta_t) \frac{df2}{dP_m} \frac{RT_m T_a}{V_m} m_t - \quad (59)$$

-continued $$f1At(\theta_t)\frac{df2}{dP_m}\frac{RT_m^2}{V_m}m_c + f1f2(P_m)\frac{dAt(\theta_t)}{d\theta_t}\frac{d\theta_t}{dt}$$

The output (differential) SA of the comparison element COM is fed back to Eq. (59). That is, an expression that represents the throttle model in the case of using the observer is the following Eq. (60):

$$\frac{dm_t}{dt} = f_1 At(\theta_t)\frac{df2}{dP_m}\frac{RT_m T_a}{V_m}m_t - f1At(\theta_t)\frac{df2}{dP_m}\frac{RT_m^2}{V_m}m_c + \quad (60)$$

$$f1f2(P_m)\frac{dAt(\theta_t)}{d\theta_t}\frac{d\theta_t}{dt} + G2(m_{tes} - m_t AFM)$$

As described above, as a result of addition of the observer OBS, the gain of a model (in this case, the throttle model M2) that estimates the cylinder intake-air quantity Mc is adjusted on the basis of an actual output from the air flowmeter 61. As a result, there can be reduced a stationary error or difference between an actual cylinder intake-air quantity and the cylinder intake-air quantity Mc obtained by use of the models M1 to M5, thereby enhancing estimation accuracy for the cylinder intake-air quantity Mc.

As described above, the fuel injection quantity control apparatus (intake-air quantity estimation apparatus) according to the first embodiment of the present invention allows a reduction in table data quantity involved in legitimacy check and thus can estimate the cylinder intake-air quantity with high accuracy and with reduced labor required for legitimacy check. Thus, the apparatus can obtain an appropriate fuel injection quantity and can use the obtained quantity for accomplishing a target air-fuel ratio.

Figure 20:
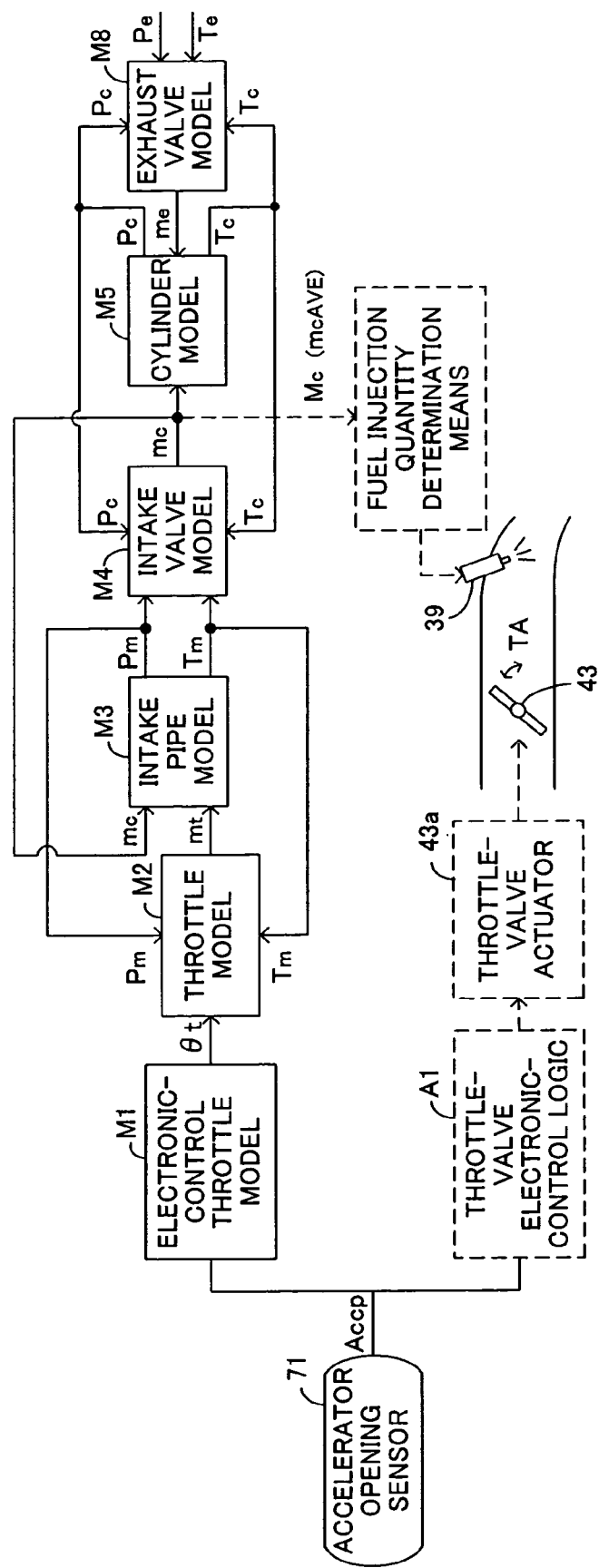
FIG. 20 is a functional block diagram showing another modification of the first embodiment of the fuel injection quantity control apparatus (intake-air quantity estimation apparatus) according to the present invention.
Figure 21:
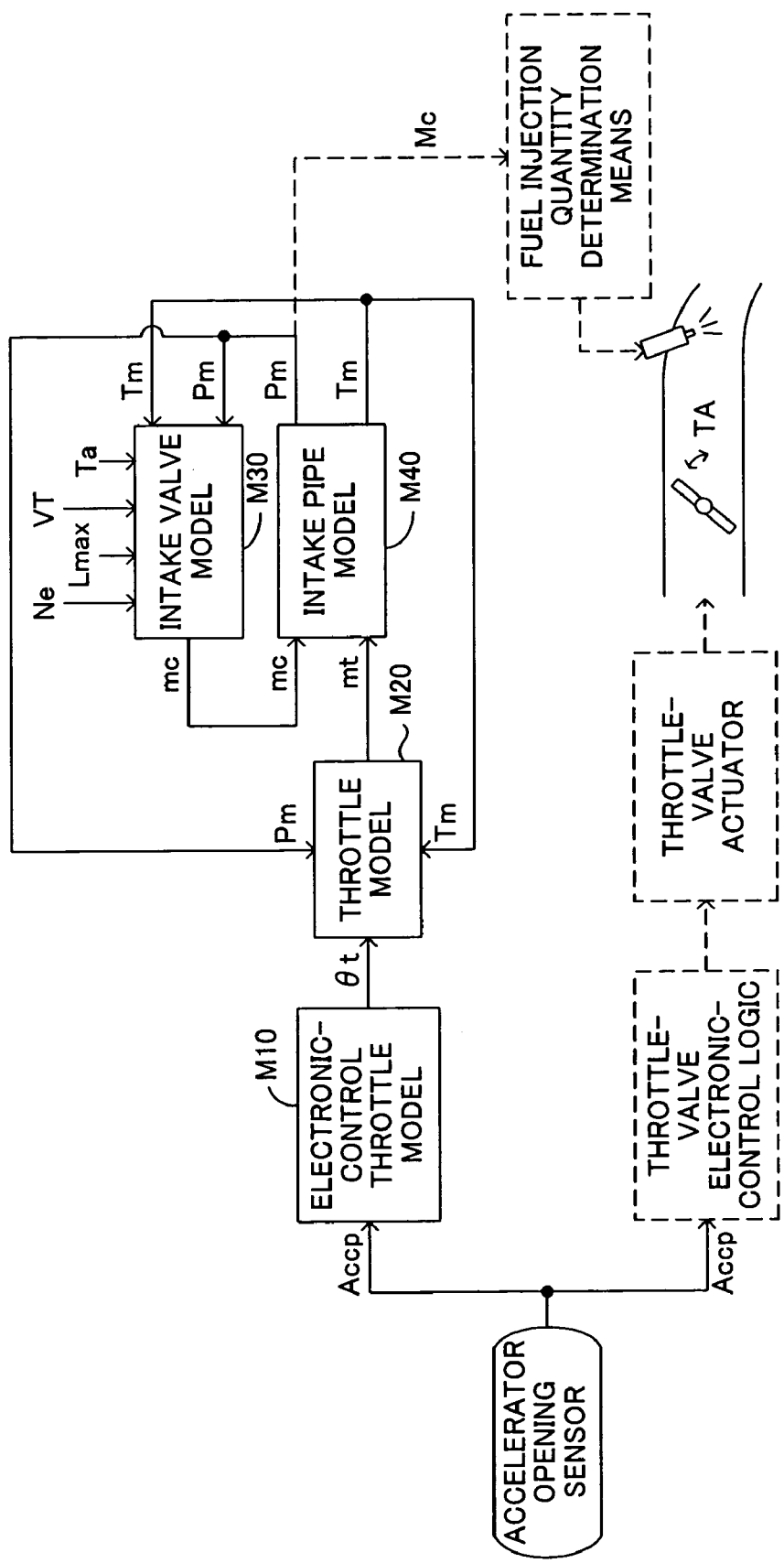
FIG. 21 is a functional block diagram of a fuel injection quantity control apparatus (intake-air quantity estimation apparatus) that the applicants of the present application have been studying.

In addition to the above-described models used in the first embodiment, an exhaust valve model may be employed for estimating the amount of air flowing into the cylinder 21 via the exhaust valve. In this case, as shown in FIG. 20, an exhaust valve model M8 is connected to the cylinder model M5 and is represented by Eqs. (61) and (62) below, which are obtained by a deduction process similar to that for the intake valve model M4. In Eqs. (61) and (62), Pe is the exhaust-pipe air pressure, and Te is the exhaust-pipe air temperature. Eq. (61) is used when air flows into the cylinder 21 from the exhaust system (Pc<Pe); and Eq. (62) is used when air flows out from the cylinder 21 to the exhaust system (Pc>Pe). Notably, in this case, configuration is such that a sensor for detecting the exhaust-pipe air pressure Pe and a sensor for detecting the exhaust-pipe air temperature Te are provided so as to use detection values of the sensors in the exhaust valve model M8. As will be described later, configuration may also be such that the exhaust-pipe air pressure Pe and the exhaust-pipe air temperature Te are estimated on the basis of operation parameters (intake-air flow rate mtAFM, engine speed NE, and the like) of the internal combustion engine 10.

$$m_c = C_v(L)A_v(L)P_e\sqrt{\frac{\kappa+1}{2\kappa RT_e}}\sqrt{\left(\frac{\kappa}{\kappa+1}\right)^2 - \left(\frac{P_c}{P_e} - \frac{1}{\kappa+1}\right)^2} \quad (61)$$

$$m_c = C_v(L)A_v(L)P_c\sqrt{\frac{\kappa+1}{2\kappa RT_c}}\sqrt{\left(\frac{\kappa}{\kappa+1}\right)^2 - \left(\frac{P_e}{P_c} - \frac{1}{\kappa+1}\right)^2} \quad (62)$$

In the above-described first embodiment, the injector 39 is configured so as to inject fuel toward the intake ports 31a and 31b. However, the injector 39 may be configured so as to inject fuel directly into the combustion chamber 25. Also, the present invention is applicable to an internal combustion engine configured such that an intake-air flow control valve (refer to Japanese Patent Application Laid-Open (kokai) No. 8-109836) is employed instead of the SCV 44 and is rotatably disposed in one of paired intake passages, which are formed in parallel with the combustion chamber 25 of each cylinder and assume the substantially same shape.

Next will be described a second embodiment of an intake-air quantity estimation apparatus for an internal combustion engine according to the present invention. The intake-air quantity estimation apparatus of the second embodiment employs a throttle-model correction section shown in the functional block diagram of FIG. 22, in addition to the models shown in FIG. 6 and employed by the above-described intake-air quantity estimation apparatus of the first embodiment. The intake-air quantity estimation apparatus is intended to enhance estimation accuracy for the intake-air quantity through correction of the throttle model M2 by means of the throttle-model correction section.

The throttle model M2 is corrected for the reason below. When the throttle-valve opening is small, even a slight change in the throttle-valve opening causes a great change in the flow rate of air passing through the throttle valve 43 (throttle-passing air flow rate mt). Thus, the throttle-passing air flow rate mt is highly susceptible to article differences (individual differences) among the throttle valves 43 and the intake pipes 41. As a result, in some cases, the throttle model M2, which is designed in the same way among internal combustion engines, may fail to accurately estimate the throttle-passing air flow rate mt.

Thus, the present intake-air quantity estimation apparatus obtains an appropriate flow coefficient $Ct(\theta t, Pm)$ of the throttle model M2 through utilization of the fact that, when the internal combustion engine 10 is in the steady state of operation (for example, in such an operation state that the throttle-valve opening is held constant for a predetermined period of time or longer), the intake-air flow rate mtAFM obtained on the basis of the output Vg of the air flowmeter 61 becomes equal to the actual cylinder intake-air flow rate mcact. On the basis of the obtained flow coefficient $Ct(\theta t, Pm)$, the intake-air quantity estimation apparatus corrects data contained in the flow coefficient table $MapCt(\theta t, Pm)$ of the throttle model M2, thereby correcting the throttle model M2.

Figure 22:
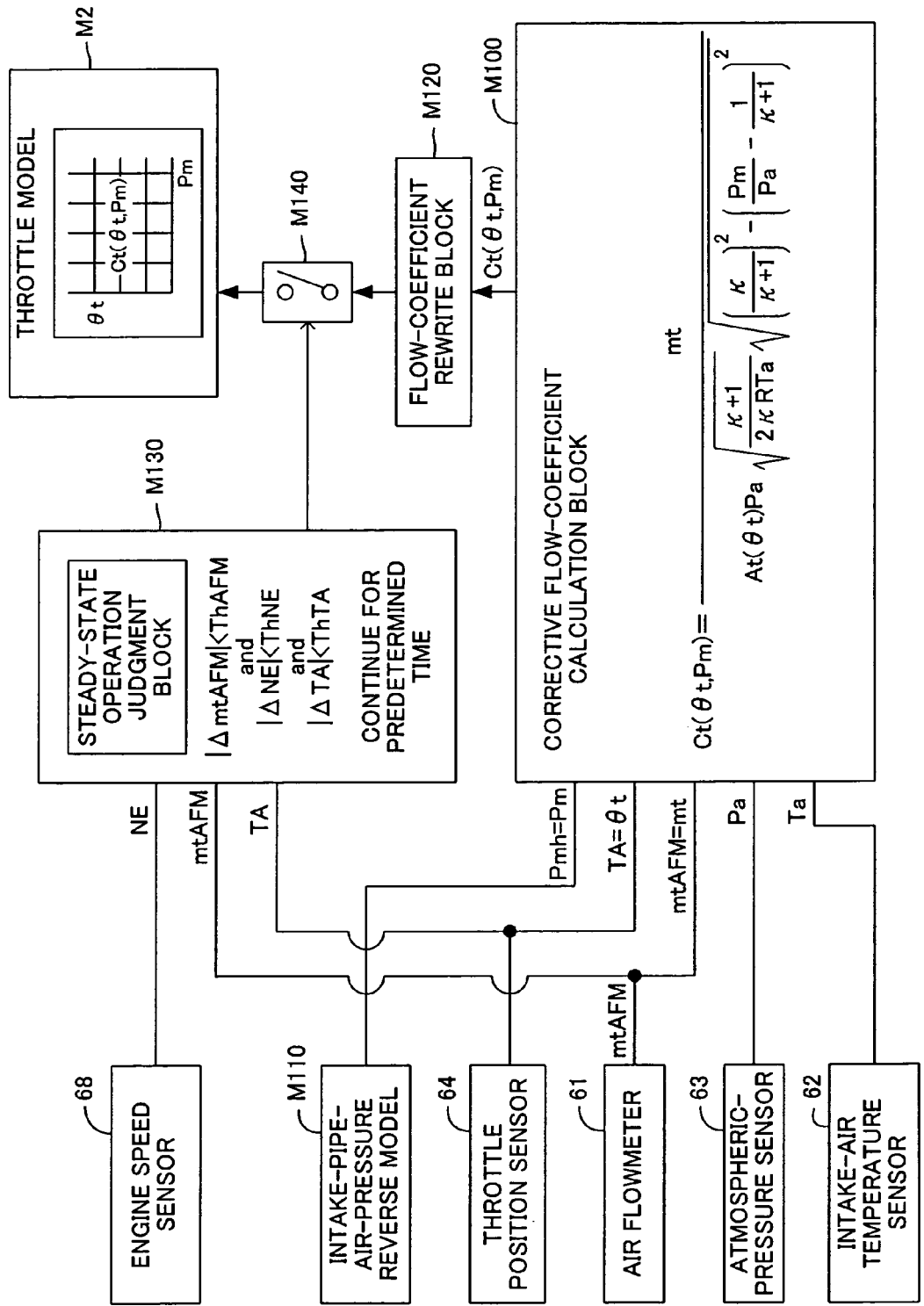
FIG. 22 is a functional block diagram of a throttle-model correction section included in an intake-air quantity estimation apparatus according to a second embodiment of the present invention.

More specifically, the throttle-model correction section shown in FIG. 22 includes a corrective flow-coefficient calculation block M100, an intake-pipe-air-pressure reverse model M110, a flow-coefficient rewrite block M120, a steady-state operation judgment block M130, and a rewrite permission block M140. Functions of these blocks are realized through the CPU 81 executing programs.

The present intake-air quantity estimation apparatus is based on the premise that models other than the throttle model M2; specifically, the electric-control throttle model M1, the intake-pipe model M3, the intake valve model M4, and the cylinder model M5, are all correct.

The present apparatus acquires input values (i.e., actual values of the throttle-valve opening θt, the intake-pipe air pressure Pm, the intake-air temperature Ta, and the throttle-valve upstream pressure Pa) to the throttle model M2 in the case where the intake valve model M4 outputs the cylinder intake-air flow rate mc coinciding with the actual cylinder intake-air flow rate mcact, and also acquires the throttle-passing air flow rate mt that the throttle model M2 is expected to output in this event, without use of the throttle model M2. On the basis of the acquired values, the apparatus obtains the flow coefficient Ct(θt,Pm) that the throttle model M2 is to use. On the basis of the obtained flow coefficient Ct(θt,Pm), the apparatus rewrites data contained in the flow coefficient table MapCt(θt,Pm) of the throttle model M2.

Functions of the constituent blocks of the throttle-model correction section will next be described in detail.

The throttle model M2 calculates the throttle-passing air flow rate mt by use of Eq. (3). Eq. (3) is given below as Eq. (63). In Eq. (63), the flow coefficient Ct(θt,Pm) appears as a value to be determined according to the throttle-valve opening θt and the intake-pipe air pressure Pm.

$$m_t = C_t(\theta_t, P_m) A_t(\theta_t) P_a \sqrt{\frac{\kappa+1}{2\kappa R T_a}} \sqrt{\left(\frac{\kappa}{\kappa+1}\right)^2 - \left(\frac{P_m}{P_a} - \frac{1}{\kappa+1}\right)^2} \quad (63)$$

As is understood from Eq. (63), when actual values of the throttle-valve opening θt, the intake-pipe air pressure Pm, the throttle-valve upstream pressure Pa, and the intake-air temperature Ta—input values to the throttle model M2—as well as the throttle-passing air flow rate mt that the throttle model M2 is expected to output in this event are obtained, the flow coefficient Ct(θt,Pm) that the throttle model M2 is to use at that point of time (when the actual values of the throttle-valve opening θt and the intake-pipe air pressure Pm are observed) can be obtained in accordance with the following Eq. (64), which is a modified expression of Eq. (63).

$$Ct(\theta t, Pm) = \frac{mt}{At(\theta t) Pa \sqrt{\frac{\kappa+1}{2\kappa RTa}} \sqrt{\left(\frac{\kappa}{\kappa+1}\right)^2 - \left(\frac{Pm}{Pa} - \frac{1}{\kappa+1}\right)^2}} \quad (64)$$

When the internal combustion engine 10 is in the steady state of operation, the corrective flow-coefficient calculation block M100 obtains the flow coefficient Ct(θt,Pm) in accordance with Eq. (64). The steady state of operation denotes a state in which at least the actual throttle-valve opening TA remains unchanged for a predetermined period of time or longer. The steady-state operation judgment block M130, which will be described later, judges whether or not the internal combustion engine 10 is in the steady state of operation.

Values in the right-hand side of Eq. (64) will next be described. When Eq. (64) is used, the internal combustion engine 10 is in the steady state of operation. Thus, the throttle-valve opening θt is equal to the actual throttle-valve opening TA, which is detected by the throttle position sensor 64 (θt=TA). Accordingly, the corrective flow-coefficient calculation block M100 receives the throttle-valve opening TA from the throttle position sensor 64 as an actual value of the throttle-valve opening θt.

Since the internal combustion engine 10 is in the steady state of operation, the flow rate of air passing through the intake pipe 41 is constant along the intake pipe 41. Accordingly, the throttle-passing air flow rate mt is equal to the intake-air flow rate mtAFM, which is obtained on the basis of the output Vg of the air flowmeter 61 (mt=mtAFM). Thus, the corrective flow-rate calculation block M100 receives the intake-air flow rate mtAFM, which is obtained on the basis of the output Vg of the air flowmeter 61, as an actual value of the throttle-passing air flow rate mt.

Furthermore, the throttle-valve upstream pressure Pa and the intake-air temperature Ta are equal to a value detected by the atmospheric-pressure sensor 63 and a value detected by the intake-air temperature sensor 62, respectively. Accordingly, the corrective flow-coefficient calculation block M100 receives the detected values from the atmospheric-pressure sensor 63 and the intake-air temperature sensor 62 as actual values of the throttle-valve upstream pressure Pa and the intake-air temperature Ta, respectively.

As described above, when the internal combustion engine 10 is in the steady state of operation, actual values can be readily obtained for the values, except the intake-pipe air pressure Pm, appearing in the right-hand side of Eq. (64). Notably, the opening area At(θt) is obtained on the basis of the throttle-valve opening θt. The ratio of specific heat κ is constant and is given beforehand.

An actual value of the intake-pipe air pressure Pm is obtained as follows. When the internal combustion engine 10 is in the steady state of operation, the flow rate of air passing through the intake pipe 41 is constant along the intake pipe 41. Accordingly, an actual cylinder intake-air flow rate mcact is equal to the intake-air flow rate mtAFM obtained on the basis of the output Vg of the air flowmeter 61. Therefore, when the cylinder intake-air flow rate mc, which is obtained by use of the intake-pipe model M3, the intake valve model M4, and the cylinder model M5 located downstream of the throttle model M2, is equal to the intake-air flow rate mtAFM (=mcact), an actual value of the intake-pipe air pressure Pm must be equal to the intake-pipe air pressure Pm that is output from the intake pipe model M3.

Figure 23:
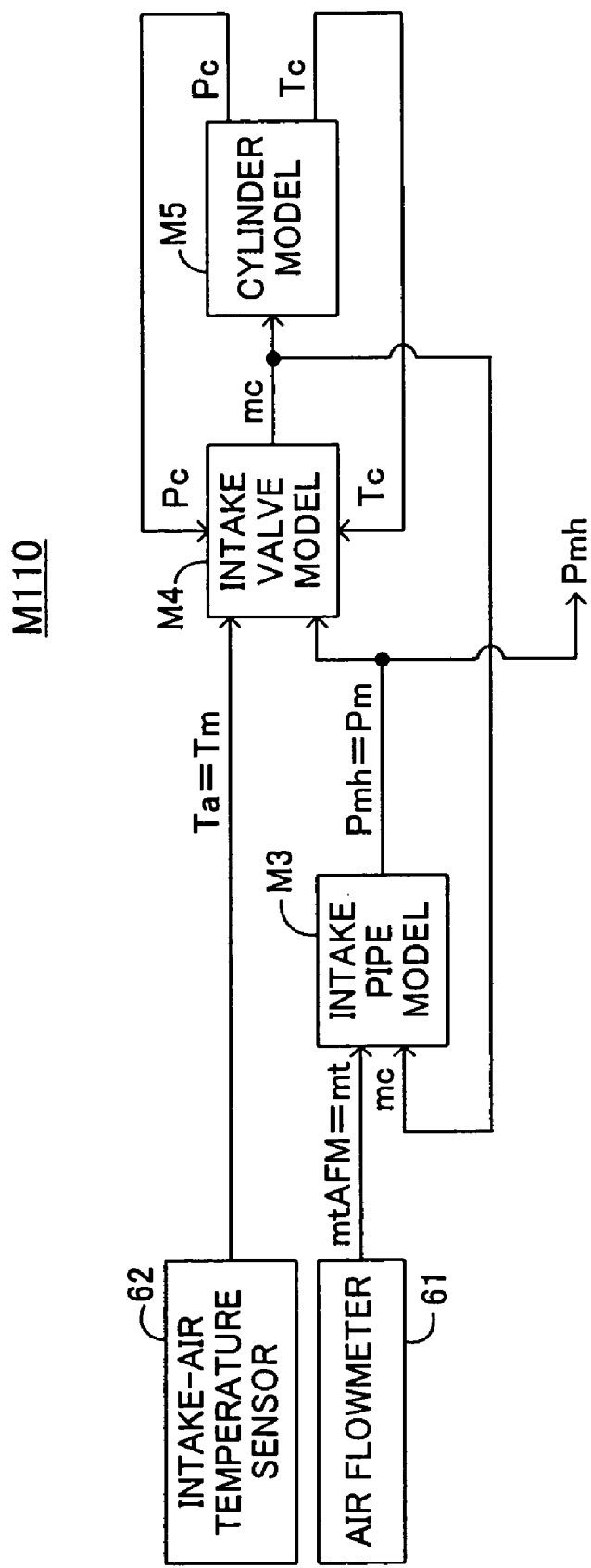
FIG. 23 is a functional block diagram of an intake-pipe air pressure reverse-model shown in FIG. 22.

The intake-pipe air pressure Pm is obtained by use of the intake-pipe-air-pressure reverse model M110. As shown in the functional block diagram of FIG. 23, the intake-pipe-air-pressure reverse model M10 is configured such that the intake pipe model M3, the intake valve model M4, and the cylinder model M5 are interconnected in a manner similar to that for the intake-air quantity estimation apparatus of the first embodiment shown in FIG. 6.

In the reverse model M110, the intake pipe model M3 receives the intake-air flow rate mtAFM, which is obtained on the basis of the output Vg of the air flowmeter 61, as an actual value of the throttle-passing air flow rate mt, and the cylinder intake-air flow rate mc, which is an output value from the intake valve model M4. The intake valve model M4 receives the intake-air temperature Ta, which is an output value from the intake-air temperature sensor 62, as an actual value of the intake-pipe air temperature Tm, and the output value Pmh from the intake pipe model M3. Notably, in place of the intake-air temperature Ta, which is an output value from the intake-air temperature sensor 62, the intake-pipe air temperature Tm, which is an output from the intake-pipe model M3, may be input to the intake valve model M4.

As mentioned previously, the present apparatus is based on the premise that the electric-control throttle model M1, the intake-pipe model M3, the intake valve model M4, and the cylinder model M5 are all correct. When the internal combustion engine 10 is in the steady state of operation, the intake-pipe-air-pressure reverse model M110 repeatedly calculates the cylinder intake-air flow rate mc by use of the intake valve model M4. Accordingly, the thus-calculated cylinder intake-air flow rate mc must converge to a value equal to the intake-air flow rate mtAFM that is obtained on the basis of the output Vg from the air flowmeter 61.

Furthermore, when the cylinder intake-air flow rate mc calculated by the intake valve model M4 is equal to the intake-air flow rate mtAFM, the intake-pipe air pressure Pmh to be output from the intake pipe model M3 must become the above-mentioned actual value of the intake-pipe air pressure Pm. As described above, the intake-pipe-air-pressure reverse model M110 obtains the intake-pipe air pressure Pmh that serves as an actual value of the intake-pipe air pressure Pm. The thus-obtained intake-pipe pressure Pmh is input, as an actual value of the intake-pipe pressure Pm, to the corrective flow-coefficient calculation block M100 shown in FIG. 22.

As described above, the corrective flow-coefficient calculation block M100 receives actual values of the throttle-valve opening θt, the intake-pipe air pressure Pm, the throttle-valve upstream pressure Pa, and the intake-air temperature Ta as well as the throttle-passing air flow rate mt that the throttle model M2 is expected to output in this event. Accordingly, the corrective flow-coefficient calculation block M100 can obtain the flow coefficient Ct(θt,Pm) that the throttle model M2 must use when the throttle valve opening, and the intake-pipe air pressure are θt and Pm, respectively. The corrective flow-coefficient calculation block M100 outputs the obtained value to the flow-coefficient rewrite block M120.

Meanwhile, the steady-state operation judgment block M130 is connected to the engine speed sensor 68, the throttle position sensor 64, and the air flowmeter 61, and receives the engine speed NE, the throttle-valve opening TA, and the intake-air flow rate mtAFM, respectively, therefrom. The steady-state operation judgment block M130 judges whether or not the following conditions have continued for a predetermined period of time (e.g., several seconds): an absolute value of a variation per unit time in the intake-air flow rate mtAFM, or an absolute value of the variation ΔmtAFM, is less than the threshold ThAFM; an absolute value of a variation per unit time in the engine speed NE, or an absolute value of the variation ΔNE, is less than the threshold ThNE; and an absolute value of a variation per unit time in the throttle-valve opening TA, or an absolute value of the variation ΔTA, is less than the threshold ThTA. When the block M130 judges that the state is continuing for the predetermined period of time or longer, the block M130 judges that the internal combustion engine 10 is in the steady state of operation and generates a rewrite permission signal to the rewrite permission block M140.

Receiving the rewrite permission signal from the steady-state operation judgment block M130, the rewrite permission block M140 permits the flow-coefficient rewrite block M120 to rewrite data contained in the flow coefficient table MapCt(θt,Pm) of the throttle model M2. In this state, the flow-coefficient rewrite block M120 rewrites (replaces) the data contained in the flow coefficient table MapCt(θt,Pm) and specified at that point of time on the basis of the intake-pipe air pressure Pm and the throttle-valve opening θt to (with) the data Ct(θt,Pm) that the corrective flow-coefficient calculation block M100 has calculated. In this manner, the throttle model M2 is corrected.

The throttle model M2 may be corrected by the following method instead of mere replacement of data: the weighted average Ctave(θt,Pm) is calculated, in accordance with Eq. (65) below, for data (for the sake of convenience, represented by Ct0(θt,Pm)) contained at that point of time in the flow coefficient table MapCt(θt,Pm) and the data Ct(θt,Pm) calculated by the corrective flow-coefficient calculation block M100; and the data contained in the flow coefficient table MapCt(θt,Pm) is replaced with the weighted average. â in Eq. (65) is an arbitrary value of 0 to 1.

$$Ctave\ (\theta t,\ Pm)=\beta \cdot Ct0(\theta t,\ Pm)+(1-\beta)\cdot Ct(\theta t,\ Pm) \quad (65)$$

As described above, the intake-air quantity estimation apparatus according to the second embodiment of the present invention includes the throttle-model correction section, which corrects a value (flow coefficient) to be used in the calculation equation of the throttle model M2, through utilization of the fact that, when the internal combustion engine 10 is in the steady state of operation, "the intake-air flow rate mtAFM measured by the air flowmeter 61, which serves as an intake-air-flow-rate-measuring means" and "the cylinder intake-air flow rate mc obtained by the intake valve model M4" become equal to each other.

In other words, the throttle-model correction section (intake-pipe-air-pressure reverse model M110) obtains the intake-pipe air pressure Pm to be used in the throttle model M2, through utilization of the fact that the intake-air flow rate mtAFM obtained on the basis of an output from the air flowmeter 61 and the cylinder intake-air flow rate mc obtained by the intake valve model M4 become equal to each other. Also, the throttle-model correction section assumes that the throttle-passing air flow rate mt obtained by the throttle model M2 is equal to the intake-air flow rate mtAFM.

Then, the throttle-model correction section obtains an appropriate value of the flow coefficient Ct(θt,Pm) to be used in the calculation equation of the throttle model M2, on the basis of the above-obtained intake-pipe air pressure Pm and the above-assumed throttle-passing air flow rate mtAFM. On the basis of the obtained appropriate value of the flow coefficient Ct(θt,Pm), the throttle-model correction section corrects the throttle model M2 (data contained in the flow coefficient table MapCt(θt,Pm) incorporated in the throttle model M2).

Accordingly, the intake-air quantity estimation apparatus according to the second embodiment can correct the throttle model M2 to an appropriate model for individual internal combustion engines 10, in addition to the advantage of the intake-air quantity estimation apparatus according to the first embodiment, thereby estimating the cylinder intake-air quantity with high accuracy. Thus, the apparatus can obtain an appropriate fuel injection quantity and can use the obtained quantity for accomplishing a target air-fuel ratio.

The corrective flow-coefficient calculation block M100 uses Eq. (64) deriving from Eq. (3), which is intended for the case of regular flow where the throttle-valve upstream pressure Pa is higher than the intake-pipe air pressure Pm. However, in the case of reverse flow where the throttle-valve upstream pressure Pa is lower than the intake-pipe air pressure Pm, the flow coefficient Ct(θt,Pm) may be obtained in accordance with Eq. (4).

The above-described second embodiment uses the air flowmeter 61 as an intake-air-flow-rate-measuring means. However, for example, the intake-air-flow-rate-measuring means may be configured in such a manner as to substantially measure the intake-air flow rate on the basis of an output from the air-fuel ratio sensor 70 and a fuel injection quantity that the CPU 81 recognizes.

While the present invention has been described with reference to embodiments of the intake-air quantity estimation apparatus according to the present invention as well as modifications thereof, the present invention is not limited thereto, but may be modified as appropriate without departing from the scope of the invention.

For example, in step 1715 shown in FIG. 17, the exhaust-pipe air pressure Pe associated with the cylinder in the process of an intake stroke may be stored as the cylinder pressure Pc(t0). In this case, configuration may be such that the exhaust-pipe air pressure Pe is obtained on the basis of the engine speed NE, the intake-air flow rate mtAFM, and a table stored beforehand in the ROM 82. In step 1725, the initial value Mc0 for the cylinder intake-air flow rate Mc1 may be determined on the basis of the exhaust-pipe air pressure Pe, the exhaust temperature Te, the cylinder volume Vco at intake-valve-opening time, and the equation of state of gas (Mc0=Pe·Vco/(R·Te). Furthermore, configuration may be such that the exhaust temperature Te is obtained on the basis of the engine speed NE, the intake-air flow rate mtAFM, the fuel injection quantity fc, and a table stored beforehand in the ROM 82.

The invention claimed is:

1. An intake-air quantity estimation apparatus for an internal combustion engine, comprising:
   an intake-air quantity estimation device that includes a cylinder pressure estimation device that estimates pressure within a cylinder through calculation using a model of the cylinder obtained based on a law of conservation of energy, the intake-air quantity estimation device estimates a cylinder intake-air quantity based on the estimated pressure within the cylinder, the cylinder intake-air quantity representing the amount of air flowing into the cylinder, wherein
   the model of the cylinder to be used by the cylinder pressure estimation device is configured based on an expression $dPc/dt=(\kappa \cdot R \cdot Tm/Vc)\cdot mc-(\kappa \cdot Pc/Vc)\cdot(dVc/dt)$, where Pc is pressure within the cylinder, $\kappa$ is the ratio of specific heat, R is a gas constant, Tm is a temperature of air flowing into the cylinder, Vc is a cylinder volume, and mc is a cylinder intake-air flow rate representing a flow rate of air flowing into the cylinder.

2. An intake-air quantity estimation apparatus for an internal combustion engine as described in claim 1, wherein the intake-air quantity estimation device is configured so as to obtain a cylinder intake-air flow rate representing the flow rate of air flowing into the cylinder by use of an intake valve model associated with air passing through an intake valve and obtained based on the law of conservation of energy, a law of conservation of momentum, and a law of conservation of mass, and to estimate the cylinder intake-air quantity based on the obtained cylinder intake-air flow rate.

3. An intake-air quantity estimation apparatus for an internal combustion engine as described in claim 1, wherein the cylinder pressure estimation device is configured so as to estimate pressure within the cylinder in accordance with an expression obtained by solving, while the cylinder volume is assumed to be constant, the expression representing the model of the cylinder, and an expression obtained by solving, while the flow rate of air flowing into the cylinder is assumed to be 0, the expression representing the model of the cylinder.

4. An intake-air quantity estimation apparatus for an internal combustion engine, comprising:
   an intake-air quantity estimation device that includes a cylinder pressure estimation device that estimates pressure within a cylinder through calculation using a model of the cylinder obtained based on a law of conservation of energy, the intake-air quantity estimation device estimates a cylinder intake-air quantity based on the estimated pressure within the cylinder, the cylinder intake-air quantity representing the amount of air flowing into the cylinder, wherein
   the model of the cylinder to be used by the cylinder pressure estimation device is configured based on an expression $dPc/dt=(\kappa \cdot R \cdot Tm/Vc)\cdot mc-(\kappa \cdot Pc/Vc)\cdot(dVc/dt)+(\kappa-1)\cdot Q/Vc$, where Pc is pressure within the cylinder, $\kappa$ is the ratio of specific heat, R is a gas constant, Tm is a temperature of air flowing into the cylinder, Vc is a cylinder volume, mc is a cylinder intake-air flow rate representing a flow rate of air flowing into the cylinder, and Q is a heat quantity to be transmitted between the cylinder and an exterior of the cylinder.

5. An intake-air quantity estimation apparatus for an internal combustion engine as described in claim 4, wherein the intake-air quantity estimation device is configured so as to obtain a cylinder intake-air flow rate representing the flow rate of air flowing into the cylinder by use of an intake valve model associated with air passing through an intake valve and obtained based on the law of conservation of energy, a law of conservation of momentum, and a law of conservation of mass, and to estimate the cylinder intake-air quantity based on the obtained cylinder intake-air flow rate.

6. An intake-air quantity estimation apparatus for an internal combustion engine as described in claim 4, wherein the cylinder pressure estimation device is configured so as to estimate pressure within the cylinder in accordance with an expression obtained by solving, while the cylinder volume is assumed to be constant, the expression representing the model of the cylinder, and an expression obtained by solving, while the flow rate of air flowing into the cylinder is assumed to be 0, the expression representing the model of the cylinder.

7. An intake-air quantity estimation apparatus for an internal combustion engine, comprising:
   an intake-air quantity estimation device that includes a cylinder pressure estimation device that estimates pressure within a cylinder through calculation using a model of the cylinder obtained based on a law of conservation of energy, the intake-air quantity estimation device estimates a cylinder intake-air quantity based on the estimated pressure within the cylinder, the cylinder intake-air quantity representing the amount of air flowing into the cylinder, wherein
   the intake-air quantity estimation device is configured so as to obtain a cylinder intake-air flow rate representing a flow rate of air flowing into the cylinder by use of an intake valve model associated with air passing through an intake valve and obtained based on the law of conservation of energy, a law of conservation of momentum, and a law of conservation of mass, and to estimate the cylinder intake-air quantity based on the obtained cylinder intake-air flow rate.

8. An intake-air quantity estimation apparatus for an internal combustion engine as described in claim 7, wherein the intake-air quantity estimation device is configured so as to estimate the cylinder intake-air quantity by use of an exhaust valve model associated with air passing through an exhaust valve and obtained based on the law of conservation of energy, the law of conservation of momentum, and the law of conservation of mass.

9. An intake-air quantity estimation apparatus for an internal combustion engine as described in claim 8, wherein the cylinder pressure estimation device is configured so as to estimate pressure within the cylinder in accordance with an expression obtained by solving, while the cylinder volume is assumed to be constant, the expression representing the model of the cylinder, and an expression obtained by solving, while the flow rate of air flowing into the cylinder is assumed to be 0, the expression representing the model of the cylinder.

10. An intake-air quantity estimation apparatus for an internal combustion engine as described in claim 7, wherein, in order to obtain an input quantity to be used by the intake valve model, the intake-air quantity estimation device is configured so as to obtain a throttle-passing air flow rate representing the flow rate of air passing through a throttle valve of the internal combustion engine in accordance with a calculation equation by use of a throttle model associated with air passing through the throttle valve; and the intake-air quantity estimation device further comprises an intake-air-flow-rate-measuring device that actually measures an intake-air flow rate representing a flow rate of air flowing through an intake passage of the internal combustion engine, and a throttle-model correction section for correcting a value to be used in a calculation equation of the throttle model through utilization of a fact that, when the internal combustion engine is in a steady state of operation, the intake-air flow rate measured by the intake-air-flow-rate-measuring device and the cylinder intake-air flow rate obtained by use of the intake valve model become equal to each other.

11. An intake-air quantity estimation apparatus for an internal combustion engine as described in claim 10, wherein the calculation equation of the throttle model is obtained based on the law of conservation of energy, the law of conservation of momentum, and the law of conservation of mass.

12. An intake-air quantity estimation apparatus for an internal combustion engine as described in claim 11, wherein the calculation equation of the throttle model is configured so as to obtain the throttle-passing air flow rate by use of at least an intake-pipe air pressure as observed downstream of the throttle valve of the internal combustion engine and a flow coefficient determined in accordance with the intake-pipe pressure; and the throttle-model correction section is configured so as to obtain the intake-pipe air pressure to be used in the throttle model, through utilization of the fact that the intake-air flow rate measured by the intake-air-flow-rate-measuring device and the cylinder intake-air flow rate obtained by use of the intake valve model become equal to each other; to assume that the throttle-passing air flow rate is equal to the intake-air flow rate measured by the intake-air-flow-rate-measuring device; to obtain an appropriate value for the flow coefficient based on the obtained intake-pipe air pressure and the assumed throttle-passing air flow rate; and to correct the flow coefficient to be used in the throttle model, based on the appropriate value for the flow coefficient.

13. An intake-air quantity estimation apparatus for an internal combustion engine as described in claim 7, wherein the cylinder pressure estimation device is configured so as to estimate pressure within the cylinder in accordance with an expression obtained by solving, while the cylinder volume is assumed to be constant, the expression representing the model of the cylinder, and an expression obtained by solving, while the flow rate of air flowing into the cylinder is assumed to be 0, the expression representing the model of the cylinder.

14. An intake-air quantity estimation apparatus for an internal combustion engine, comprising:

an intake-air Quantity estimation device that includes a cylinder pressure estimation device that estimates pressure within a cylinder through calculation using a model of the cylinder obtained based on a law of conservation of energy, the intake-air quantity estimation device estimates a cylinder intake-air quantity based on the estimated pressure within the cylinder, the cylinder intake-air quantity representing the amount of air flowing into the cylinder, wherein the cylinder pressure estimation device is configured so as to estimate pressure within the cylinder in accordance with an expression obtained by solving, while a cylinder volume is assumed to be constant, an expression representing the model of the cylinder, and an expression obtained by solving, while a flow rate of air flowing into the cylinder is assumed to be 0, the expression representing the model of the cylinder.

* * * * *